(12) United States Patent
O'Hare et al.

(10) Patent No.: US 10,888,854 B2
(45) Date of Patent: Jan. 12, 2021

(54) CATALYST COMPRISING PERMETHYLPENTALENE LIGANDS

(71) Applicant: Oxford University Innovation Limited, Oxford (GB)

(72) Inventors: Dermot O'Hare, Oxford (GB); Jean-Charles Buffet, Oxford (GB); Zoe Turner, Oxford (GB); Duncan Fraser, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 56 days.

(21) Appl. No.: 15/766,170

(22) PCT Filed: Oct. 4, 2016

(86) PCT No.: PCT/GB2016/053085
§ 371 (c)(1),
(2) Date: Apr. 5, 2018

(87) PCT Pub. No.: WO2017/060689
PCT Pub. Date: Apr. 13, 2017

(65) Prior Publication Data
US 2019/0111417 A1  Apr. 18, 2019

(30) Foreign Application Priority Data
Oct. 6, 2015 (GB) .................................. 1517648.0

(51) Int. Cl.
*B01J 31/22* (2006.01)
*C08F 110/02* (2006.01)
(Continued)

(52) U.S. Cl.
CPC ....... *B01J 31/2295* (2013.01); *C08F 4/65912* (2013.01); *C08F 4/65916* (2013.01);
(Continued)

(58) Field of Classification Search
None
See application file for complete search history.

(56) References Cited

U.S. PATENT DOCUMENTS 8,404,880 B2   3/2013   Kaji et al.
9,340,630 B2   5/2016   Kaji et al.
(Continued)

FOREIGN PATENT DOCUMENTS

WO   WO1999/007716   2/1999
WO   WO2008/110774   9/2008
(Continued)

OTHER PUBLICATIONS

Chadwick et al. Organometallics, 33, 2014, 3775-3785 (Year: 2014).*

(Continued)

*Primary Examiner* — Yun Qian
(74) *Attorney, Agent, or Firm* — Barnes & Thornburg LLP

(57) ABSTRACT

Catalytic compositions comprising permethylpentalene based metallocene complexes supported on solid methylaluminoxane are disclosed. The compositions are effective catalysts/initiators in the polymerisation of olefins. Also disclosed are uses of the compositions in olefin polymerisation.

10 Claims, 16 Drawing Sheets

(51) Int. Cl.
*C08F 4/659* (2006.01)
*C08F 4/6592* (2006.01)
*C08F 10/02* (2006.01)

(52) U.S. Cl.
CPC .......... *C08F 4/65925* (2013.01); *C08F 10/02* (2013.01); *C08F 110/02* (2013.01); *B01J 2231/122* (2013.01); *B01J 2531/48* (2013.01)

(56) References Cited

U.S. PATENT DOCUMENTS

| | | | |
|---|---|---|---|
| 2013/0059990 A1 | 3/2013 | Kaji et al. | |
| 2013/0158307 A1* | 6/2013 | Wu | C07C 2/34 585/16 |
| 2015/0057418 A1* | 2/2015 | Kaji | C08G 79/10 526/160 |

FOREIGN PATENT DOCUMENTS

| | | | |
|---|---|---|---|
| WO | WO2010/055652 | 4/2012 | |
| WO | PCT/JP2013/057355 | * 10/2013 | ............... C07F 5/061 |
| WO | WO2013/146337 | 12/2015 | |

OTHER PUBLICATIONS

Severn et al. (Methylaluminoxane (MAO), Silica and a Complex: The "Holy Trinity" of Supported Sing-site Catalyst. Tailor-Made Polymers: via Immobilization of Alpha-Olefin Polymerization Catalysts. Wiley-VCH, Chapter 4, pp. 95-138, 2008 (Year: 2008).*

Chadwick, Mark F. et al., "Zirconium and Hafnium Permethylpentalene Compounds," *Organometallics*, 2016, 35 (12), pp. 2092-2100. Published online Jun. 9, 2016.
Fraser, Duncan A. X. et al., "Titanium and Zirconium Permethylpentalene Complexes, PnMCpRX, as Ethylene Polymerization Catalysts," *Organometallics*, 2016, 35 (16), pp. 2664-2674. Published online Aug. 1, 2016.
Buffet, Jean-Charles et al., "Ethylene polymerization using solid catalysts based on layered double hydroxides," *Polym. Chem.*, 2015, 6, 2493. First published Feb. 12, 2015.
Cooper, Robert T., "Synthesis and Characterization of Group 4 Permethylpentalene Dichloride Complexes," *Organometallics*, 2013, 32 (7), pp. 2228-2233. Published online Mar. 19, 2013.
Turner, Zoë R. et al., "Chiral Group 4 Cyclopentadienyl Complexes and Their Use in Polymerization of Lactide Monomers." *Organometallics*, 2014, 33 (14), pp. 3891-3903. Published online Jul. 17, 2014.
Chadwick, Mark F. et al., "Early Transition Metal Permethylpentalene Complexes for the Polymerization of Ethylene," *Organometallics*, 2014, 33 (14), pp. 3775-3785. Published online Jul. 7, 2014.
Fraser, Duncan A. et al., "Titanium and Zirconium η8-Permethylpentalene Complexes as Ethylene Polymerisation Catalysts," Poster, presented Sep. 3, 2015.
Fraser, Duncan A. X. et al., "Ti and Zr $n^8$-Permethylpentalene Complexes as Ethylene Polymerisation Catalysts," Poster, presented Jul. 17, 2016.
Turner, Zoë R. et al., "Permethylpentalene group 4 alkoxide for lactide polymerisation," Poster, presented Mar. 30, 2017.
Fraser, Duncan A. X. et al., "PnZrCp$^R$X: Evidence for a New Mechanism of Ethylene Polymerisation," Poster, presented Jul. 9, 2017.
International Search Report and Written Opinion for PCT/GB2016/053085 dated Dec. 13, 2016.
UK Search Report for GB1517648.0 dated Apr. 19. 2016.

* cited by examiner

CATALYST COMPRISING PERMETHYLPENTALENE LIGANDS

CROSS-REFERENCE TO RELATED APPLICATIONS

This application is a national stage entry under 35 USC § 371 of PCT International Application Number PCT/GB2016/053085, filed Oct. 4, 2016, which claims priority to United Kingdom Patent Application Number 1517648.0, filed Oct. 6, 2015, the entire disclosures of which are expressly incorporated by reference herein.

INTRODUCTION

The present invention relates to catalytic compositions. More specifically, the present invention relates to particular metallocene catalytic compositions, and the use of such compositions in olefin polymerization reactions. Even more specifically, the present invention relates to compositions containing metallocene compounds having permethylpentalene ligands, and the use of such compositions in ethylene polymerization reactions.

BACKGROUND OF THE INVENTION

It is well known that ethylene (and α-olefins in general) can be readily polymerized at low or medium pressures in the presence of certain transition metal catalysts. These catalysts are generally known as Zeigler-Natta type catalysts.

A particular group of these Ziegler-Natta type catalysts, which catalyse the polymerization of ethylene (and α-olefins in general), comprise an aluminoxane activator and a metallocene transition metal catalyst. Metallocenes comprise a metal bound between two $\eta^5$-cyclopentadienyl type ligands.

Numerous metallocenes catalysts are known in the art. However, there remains a need for improved metallocene catalysts for use in olefin polymerization reactions. In particular, there remains a need for new metallocene catalysts with high polymerization activities/efficiencies.

The present invention was devised with the foregoing in mind.

SUMMARY OF THE INVENTION

According to a first aspect of the present invention there is provided a composition comprising a solid methyl aluminoxane support material and compound of formula I defined herein.

According to a further aspect of the present invention, there is provided a use of a composition defined herein in the polymerisation of olefins.

According to a further aspect of the present invention, there is provided a process for polymerising one or more olefins, said process comprising the step of polymerising the one or more olefins in the presence of:

(i) a composition defined herein; and (ii) a suitable activator.

According to another aspect of the present invention, there is provided a polymer obtainable, obtained or directly obtained by a process defined herein.

DETAILED DESCRIPTION OF THE INVENTION

Definitions

The term "alkyl" as used herein includes reference to a straight or branched chain alkyl moieties, typically having 1, 2, 3, 4, 5 or 6 carbon atoms. This term includes reference to groups such as methyl, ethyl, propyl (n-propyl or isopropyl), butyl (n-butyl, sec-butyl or tert-butyl), pentyl (including neopentyl), hexyl and the like. In particular, an alkyl may have 1, 2, 3 or 4 carbon atoms.

The term "alkenyl" as used herein include reference to straight or branched chain alkenyl moieties, typically having 2, 3, 4, 5 or 6 carbon atoms. The term includes reference to alkenyl moieties containing 1, 2 or 3 carbon-carbon double bonds (C═C). This term includes reference to groups such as ethenyl (vinyl), propenyl (allyl), butenyl, pentenyl and hexenyl, as well as both the cis and trans isomers thereof.

The term "alkynyl" as used herein include reference to straight or branched chain alkynyl moieties, typically having 2, 3, 4, 5 or 6 carbon atoms. The term includes reference to alkynyl moieties containing 1, 2 or 3 carbon-carbon triple bonds (C≡C). This term includes reference to groups such as ethynyl, propynyl, butynyl, pentynyl and hexynyl.

The term "alkoxy" as used herein include reference to —O-alkyl, wherein alkyl is straight or branched chain and comprises 1, 2, 3, 4, 5 or 6 carbon atoms. In one class of embodiments, alkoxy has 1, 2, 3 or 4 carbon atoms. This term includes reference to groups such as methoxy, ethoxy, propoxy, isopropoxy, butoxy, tert-butoxy, pentoxy, hexoxy and the like.

The term "aryl" as used herein includes reference to an aromatic ring system comprising 6, 7, 8, 9 or 10 ring carbon atoms. Aryl is often phenyl but may be a polycyclic ring system, having two or more rings, at least one of which is aromatic. This term includes reference to groups such as phenyl, naphthyl and the like.

The term "carbocyclyl" as used herein includes reference to an alicyclic moiety having 3, 4, 5, 6, 7 or 8 carbon atoms. The group may be a bridged or polycyclic ring system. More often cycloalkyl groups are monocyclic. This term includes reference to groups such as cyclopropyl, cyclobutyl, cyclopentyl, cyclohexyl, norbornyl, bicyclo[2.2.2]octyl and the like.

The term "heterocyclyl" as used herein includes reference to a saturated (e.g. heterocycloalkyl) or unsaturated (e.g. heteroaryl) heterocyclic ring moiety having from 3, 4, 5, 6, 7, 8, 9 or 10 ring atoms, at least one of which is selected from nitrogen, oxygen, phosphorus, silicon and sulphur. In particular, heterocyclyl includes a 3- to 10-membered ring or ring system and more particularly a 5- or 6-membered ring, which may be saturated or unsaturated.

A heterocyclic moiety is, for example, selected from oxiranyl, azirinyl, 1,2-oxathiolanyl, imidazolyl, thienyl, furyl, tetrahydrofuryl, pyranyl, thiopyranyl, thianthrenyl, isobenzofuranyl, benzofuranyl, chromenyl, 2H-pyrrolyl, pyrrolyl, pyrrolinyl, pyrrolidinyl, imidazolyl, imidazolidinyl, benzimidazolyl, pyrazolyl, pyrazinyl, pyrazolidinyl, thiazolyl, isothiazolyl, dithiazolyl, oxazolyl, isoxazolyl, pyridyl, pyrazinyl, pyrimidinyl, piperidyl, piperazinyl, pyridazinyl, morpholinyl, thiomorpholinyl, especially thiomorpholino, indolizinyl, isoindolyl, 3H-indolyl, indolyl, benzimidazolyl, cumaryl, indazolyl, triazolyl, tetrazolyl, purinyl, 4H-quinolizinyl, isoquinolyl, quinolyl, tetrahydroquinolyl, tetrahydroisoquinolyl, decahydroquinolyl, octahydroisoquinolyl, benzofuranyl, dibenzofuranyl, benzothiophenyl, dibenzothiophenyl, phthalazinyl, naphthyridinyl, quinoxalyl, quinazolinyl, quinazolinyl, cinnolinyl, pteridinyl, carbazolyl, β-carbolinyl, phenanthridinyl, acridinyl, perimidinyl, phenanthrolinyl, furazanyl, phenazinyl, phenothiazinyl, phenoxazinyl, chromenyl, isochromanyl, chromanyl and the like.

The term "heteroaryl" as used herein includes reference to an aromatic heterocyclic ring system having 5, 6, 7, 8, 9 or 10 ring atoms, at least one of which is selected from nitrogen, oxygen and sulphur. The group may be a polycyclic ring system, having two or more rings, at least one of which is aromatic, but is more often monocyclic. This term includes reference to groups such as pyrimidinyl, furanyl, benzo[b]thiophenyl, thiophenyl, pyrrolyl, imidazolyl, pyrrolidinyl, pyridinyl, benzo[b]furanyl, pyrazinyl, purinyl, indolyl, benzimidazolyl, quinolinyl, phenothiazinyl, triazinyl, phthalazinyl, 2H-chromenyl, oxazolyl, isoxazolyl, thiazolyl, isoindolyl, indazolyl, purinyl, isoquinolinyl, quinazolinyl, pteridinyl and the like.

The term "halogen" or "halo" as used herein includes reference to F, Cl, Br or I. In a particular, halogen may be F or Cl, of which Cl is more common.

The term "substituted" as used herein in reference to a moiety means that one or more, especially up to 5, more especially 1, 2 or 3, of the hydrogen atoms in said moiety are replaced independently of each other by the corresponding number of the described substituents. The term "optionally substituted" as used herein means substituted or unsubstituted.

It will, of course, be understood that substituents are only at positions where they are chemically possible, the person skilled in the art being able to decide (either experimentally or theoretically) without inappropriate effort whether a particular substitution is possible. For example, amino or hydroxy groups with free hydrogen may be unstable if bound to carbon atoms with unsaturated (e.g. olefinic) bonds. Additionally, it will of course be understood that the substituents described herein may themselves be substituted by any substituent, subject to the aforementioned restriction to appropriate substitutions as recognised by the skilled person.

Compositions of the Invention

As discussed hereinbefore, the present invention provides a composition comprising a solid methyl aluminoxane support material and compound of formula I shown below:

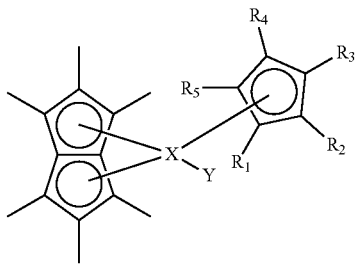

(I)

wherein $R_1$ and $R_2$ are each independently hydrogen or linear (1-4C)alkyl, or $R_1$ and $R_2$ are linked such that, when taken in combination with the atoms to which they are attached, they form a 6-membered fused aromatic ring optionally substituted with one or more groups selected from (1-6C) alkyl, (2-6C)alkenyl, (2-6C)alkynyl, (1-6C)alkoxy, aryl, heteroaryl, carbocyclic and heterocyclic, wherein each aryl, heteroaryl, carbocyclic and heterocyclic group is optionally substituted with one or more groups selected from (1-6C) alkyl, (2-6C)alkenyl, (2-6C)alkynyl, (1-6C)alkoxy, halo, amino, nitro, cyano, (1-6C)alkylamino, [(1-6C)alkyl]$_2$amino and —S(O)$_2$(1-6C)alkyl;

$R_3$ and $R_4$ are each independently hydrogen or linear (1-4C)alkyl, or $R_3$ and $R_4$ are linked such that, when taken in combination with the atoms to which they are attached, they form a 6-membered fused aromatic ring optionally substituted with one or more groups selected from (1-6C) alkyl, (2-6C)alkenyl, (2-6C)alkynyl, (1-6C)alkoxy, aryl, heteroaryl, carbocyclic and heterocyclic, wherein each aryl, heteroaryl, carbocyclic and heterocyclic group is optionally substituted with one or more groups selected from (1-6C) alkyl, (2-6C)alkenyl, (2-6C)alkynyl, (1-6C)alkoxy, halo, amino, nitro, cyano, (1-6C)alkylamino, [(1-6C)alkyl]$_2$amino and —S(O)$_2$(1-6C)alkyl;

$R_5$ is hydrogen or linear (1-4C)alkyl;

X is selected from zirconium or hafnium; and

Y is selected from halo, hydride, a phosphonated, sulfonated or borate anion, or a (1-6C)alkyl, (2-6C) alkenyl, (2-6C)alkynyl, (1-6C)alkoxy, —C(O)NR$_a$R$_b$, NR$_a$R$_b$, aryl or aryloxy group which is optionally substituted with one or more groups selected from halo, (1-4C)alkyl, nitro, NR$_a$R$_b$, phenyl, (1-6C)alkoxy, —C(O)NR$_a$R$_b$, or Si[(1-4C)alkyl]$_3$;

wherein R$_a$ and R$_b$ are independently hydrogen or (1-4C)alkyl.

The compositions of the invention exhibit superior catalytic performance when compared with current permethyl pentalene metallocene compounds/compositions used in the polymerisation of α-olefins. In particular, when compared with analogous silica-supported methyl aluminoxane (SS-MAO) catalyst compositions, the solid MAO compositions of the invention exhibit unusually high catalytic activity in the polymerisation of α-olefins.

Solid methyl aluminoxane (MAO) (often referred to as polymethylaluminoxane) is distinguished from other methyl aluminoxanes (MAOs) as it is insoluble in hydrocarbon solvents and so may act as a heterogeneous support system in a suitable hydrocarbon solvent. Any suitable solid MAO support may be used.

The terms "solid methyl aluminoxane", "solid MAO" and "solid polymethylaluminoxane" are used synonymously herein to refer to a solid-phase material having the general formula-[(Me)AlO]$_n$—, wherein n is an integer from 4 to 50 (e.g. 10 to 50). Any suitable solid polymethylaluminoxane may be used.

There exist numerous substantial structural and behavioural differences between solid polymethylaluminoxane and other (non-solid) MAOs. Perhaps most notably, solid polymethylaluminoxane is distinguished from other MAOs as it is insoluble in hydrocarbon solvents and so acts as a heterogeneous support system. The solid polymethylaluminoxane useful in the compositions of the invention are insoluble in toluene and hexane.

In contrast to non-solid (hydrocarbon-soluble) MAOs, which are traditionally used as an activator species in slurry polymerisation or to modify the surface of a separate solid support material (e.g. SiO$_2$), the solid polymethylaluminoxanes useful as part of the present invention are themselves suitable for use as solid-phase support materials, without the need for an additional activator. Hence, compositions of the invention comprising solid polymethylaluminoxane are devoid of any other species that could be considered a solid support (e.g. inorganic material such as SiO$_2$, Al$_2$O$_3$ and ZrO$_2$). Moreover, given the dual function of the solid polymethylaluminoxane (as catalytic support and activator species), the compositions of the invention comprising solid MAO may contain no additional catalytic activator species.

In an embodiment, the solid polymethylaluminoxane is prepared by heating a solution containing MAO and a hydrocarbon solvent (e.g. toluene), so as to precipitate solid polymethylaluminoxane. The solution containing MAO and a hydrocarbon solvent may be prepared by reacting trimethyl aluminium and benzoic acid in a hydrocarbon solvent (e.g. toluene), and then heating the resulting mixture.

In an embodiment, the solid polymethylaluminoxane is prepared according to the following protocol:

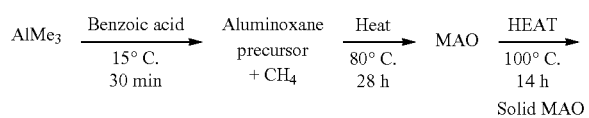

The properties of the solid polymethylaluminoxane can be adjusted by altering one or more of the processing variables used during its synthesis. For example, in the above-outlined protocol, the properties of the solid polymethylaluminoxane may be adjusted by varying the Al:O ratio, by fixing the amount of AlMe$_3$ and varying the amount of benzoic acid. Exemplary Al:O ratios are 1:1, 1.1:1, 1.2:1, 1.3:1, 1.4:1 and 1.6:1. Suitably the Al:O ratio is 1.2:1 or 1.3:1. Alternatively, the properties of the solid polymethylaluminoxane may be adjusted by fixing the amount of benzoic acid and varying the amount of AlMe$_3$.

In another embodiment, the solid polymethylaluminoxane is prepared according to the following protocol:

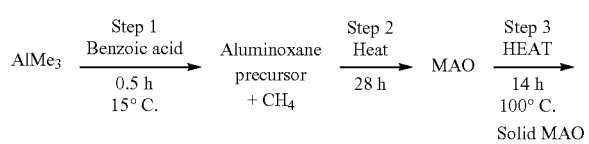

In the above protocol, steps 1 and 2 may be kept constant, with step 2 being varied. The temperature of step 2 may be 70-100° C. (e.g. 70° C., 80° C., 90° C. or 100° C.). The duration of step 2 may be from 12 to 28 hours (e.g. 12, 20 or 28 hours). The duration of step 2 may be from 5 minutes to 24 hours. Step 3 may be conducted in a solvent such as toluene.

In an embodiment, the aluminium content of the solid polymethylaluminoxane falls within the range of 36-41 wt %.

The solid polymethylaluminoxane useful as part of the present invention is characterised by extremely low solubility in toluene and n-hexane. In an embodiment, the solubility in n-hexane at 25° C. of the solid polymethylaluminoxane is 0-2 mol %. Suitably, the solubility in n-hexane at 25° C. of the solid polymethylaluminoxane is 0-1 mol %. More suitably, the solubility in n-hexane at 25° C. of the solid polymethylaluminoxane is 0-0.2 mol %. Alternatively or additionally, the solubility in toluene at 25° C. of the solid polymethylaluminoxane is 0-2 mol %. Suitably, the solubility in toluene at 25° C. of the solid polymethylaluminoxane is 0-1 mol %. More suitably, the solubility in toluene at 25° C. of the solid polymethylaluminoxane is 0-0.5 mol %. The solubility in solvents can be measured by the method described in JP-B(KOKOKU)-H07 42301.

In a particularly suitable embodiment, the solid polymethylaluminoxane is as described in US2013/0059990, WO2010/055652 or WO2013/146337, and is obtainable from Tosoh Finechem Corporation, Japan.

In an embodiment, the mole ratio of solid polymethylaluminoxane to the compound of formula (I) is 50:1 to 500:1. Suitably, the mole ratio of solid polymethylaluminoxane to the compound of formula (I) is 75:1 to 400:1. More suitably, the mole ratio of solid polymethylaluminoxane to the compound of formula (I) is 100:1 to 300:1.

In an embodiment, the solid MAO support is insoluble in toluene and hexane.

In another embodiment, the solid MAO support is in particulate form. Suitably, the particles of the solid MAO support are spherical, or substantially spherical, in shape.

The compound of formula (I) may be immobilized on the solid MAO support by one or more ionic or covalent interactions.

In an embodiment, the composition further comprises one or more suitable activators. Suitable activators are well known in the art and include organo aluminium compounds (e.g. alkyl aluminium compounds). Particularly suitable activators include aluminoxanes (e.g. methylaluminoxane (MAO)), triisobutylaluminium (TIBA), diethylaluminium (DEAC) and triethylaluminium (TEA). The one or more activators may take the form of a species capable of scavenging one or more of oxygen, water and other protic impurities.

In another embodiment, the solid MAO support comprises at least one additional compound selected from $M(C_6F_5)_3$, wherein M is aluminium or boron, or $M'R_2$, wherein M' is zirconium or magnesium and R is (1-10C) alkyl (e.g. methyl or octyl).

In an embodiment, when Y is Cl, at least one of $R_1$, $R_2$, $R_3$, $R_4$ and $R_5$ is a group other than H In an embodiment, at least one of $R_1$, $R_2$, $R_3$, $R_4$ and $R_5$ is a group other than H.

In another embodiment, the composition does not comprise a compound of formula I having either of the following structures:

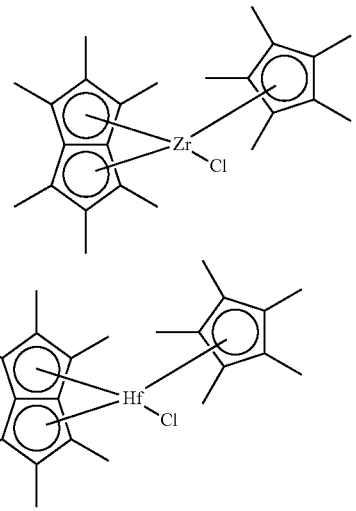

In another embodiment, $R_1$ and $R_2$ are each independently hydrogen or linear (1-4C)alkyl, or $R_1$ and $R_2$ are linked such that, when taken in combination with the atoms to which they are attached, they form a 6-membered fused aromatic ring optionally substituted with one or more groups selected from (1-6C)alkyl, (2-6C)alkenyl, (2-6C)alkynyl, (1-6C) alkoxy, aryl, heteroaryl, carbocyclic and heterocyclic, wherein each aryl, heteroaryl, carbocyclic and heterocyclic group is optionally substituted with one or more groups selected from (1-6C)alkyl, (2-6C)alkenyl, (2-6C)alkynyl, (1-6C)alkoxy and halo.

Suitably, $R_1$ and $R_2$ are each independently hydrogen or linear (1-4C)alkyl, or $R_1$ and $R_2$ are linked such that, when taken in combination with the atoms to which they are attached, they form a 6-membered fused aromatic ring optionally substituted with one or more groups selected from (1-6C)alkyl, (2-6C)alkenyl, (2-6C)alkynyl, (1-6C)alkoxy, aryl or heteroaryl, wherein each aryl or heteroaryl group is optionally substituted with one or more groups selected from (1-6C)alkyl, (2-6C)alkenyl, (2-6C)alkynyl, (1-6C)alkoxy and halo.

More suitably, $R_1$ and $R_2$ are each independently hydrogen or linear (1-4C)alkyl, or $R_1$ and $R_2$ are linked such that, when taken in combination with the atoms to which they are attached, they form a 6-membered fused aromatic ring optionally substituted with one or more groups selected from (1-4C)alkyl, (2-4C)alkenyl, (2-4C)alkynyl, (1-4C)alkoxy, aryl or heteroaryl, wherein each aryl or heteroaryl group is optionally substituted with one or more groups selected from (1-4C)alkyl, (2-4C)alkenyl, (2-4C)alkynyl, (1-4C)alkoxy and halo.

Even more suitably, $R_1$ and $R_2$ are each independently hydrogen or linear (1-4C)alkyl, or $R_1$ and $R_2$ are linked such that, when taken in combination with the atoms to which they are attached, they form a 6-membered fused aromatic ring.

Even more suitably, $R_1$ and $R_2$ are each independently hydrogen, methyl or n-butyl, or $R_1$ and $R_2$ are linked such that, when taken in combination with the atoms to which they are attached, they form a 6-membered fused aromatic ring.

In another embodiment, $R_3$ and $R_4$ are each independently hydrogen or linear (1-4C)alkyl, or $R_1$ and $R_2$ are linked such that, when taken in combination with the atoms to which they are attached, they form a 6-membered fused aromatic ring optionally substituted with one or more groups selected from (1-6C)alkyl, (2-6C)alkenyl, (2-6C)alkynyl, (1-6C) alkoxy, aryl, heteroaryl, carbocyclic and heterocyclic, wherein each aryl, heteroaryl, carbocyclic and heterocyclic group is optionally substituted with one or more groups selected from (1-6C)alkyl, (2-6C)alkenyl, (2-6C)alkynyl, (1-6C)alkoxy and halo.

Suitably, $R_3$ and $R_4$ are each independently hydrogen or linear (1-4C)alkyl, or $R_1$ and $R_2$ are linked such that, when taken in combination with the atoms to which they are attached, they form a 6-membered fused aromatic ring optionally substituted with one or more groups selected from (1-6C)alkyl, (2-6C)alkenyl, (2-6C)alkynyl, (1-6C)alkoxy, aryl or heteroaryl, wherein each aryl or heteroaryl group is optionally substituted with one or more groups selected from (1-6C)alkyl, (2-6C)alkenyl, (2-6C)alkynyl, (1-6C)alkoxy and halo.

More suitably, $R_3$ and $R_4$ are each independently hydrogen or linear (1-4C)alkyl, or $R_1$ and $R_2$ are linked such that, when taken in combination with the atoms to which they are attached, they form a 6-membered fused aromatic ring optionally substituted with one or more groups selected from (1-4C)alkyl, (2-4C)alkenyl, (2-4C)alkynyl, (1-4C)alkoxy, aryl or heteroaryl, wherein each aryl or heteroaryl group is optionally substituted with one or more groups selected from (1-4C)alkyl, (2-4C)alkenyl, (2-4C)alkynyl, (1-4C)alkoxy and halo.

Even more suitably, $R_3$ and $R_4$ are each independently hydrogen or linear (1-4C)alkyl, or $R_1$ and $R_2$ are linked such that, when taken in combination with the atoms to which they are attached, they form a 6-membered fused aromatic ring.

Even more suitably, $R_3$ and $R_4$ are each independently hydrogen, methyl or n-butyl, or $R_3$ and $R_4$ are linked such that, when taken in combination with the atoms to which they are attached, they form a 6-membered fused aromatic ring.

In another embodiment, $R_5$ is hydrogen, methyl or n-butyl.

In another embodiment, $R_5$ is hydrogen or methyl. Suitably, $R_5$ is hydrogen.

In another embodiment, X is zirconium.

Y is selected from halo, hydride, amide, a phosphonated, sulfonated or borate anion, or a (1-6C)alkyl, (2-6C)alkenyl, (2-6C)alkynyl, (1-6C)alkoxy, —C(O)NR$_a$R$_b$, —NR$_a$R$_b$, aryl or aryloxy group which is optionally substituted with one or more groups selected from halo, (1-4C)alkyl, nitro, —NR$_a$R$_b$, phenyl, (1-6C)alkoxy, —C(O)NR$_a$R$_b$, or Si[(1-4C)alkyl]$_3$. Suitably, Y is —NR$_a$R$_b$, wherein R$_a$ and R$_b$ are both hydrogen and are both substituted with phenyl to yield a group —N(C$_6$H$_5$)$_2$.

In another embodiment, Y is selected from halo, hydride, amide, a phosphonated, sulfonated or borate anion, or a (1-6C)alkyl, (2-6C)alkenyl, (2-6C)alkynyl, (1-6C)alkoxy, —NR$_a$R$_b$, aryl or aryloxy group which is optionally substituted with one or more groups selected from halo, (1-4C) alkyl and phenyl.

In another embodiment, Y is selected from halo, hydride, a phosphonated, sulfonated or borate anion, or a (1-6C) alkyl, (2-6C)alkenyl, (2-6C)alkynyl, (1-6C)alkoxy, —NR$_a$R$_b$, aryl or aryloxy group which is optionally substituted with one or more groups selected from halo, (1-4C) alkyl and phenyl.

Suitably, Y is selected from halo, hydride, or a (1-6C) alkyl, (2-6C)alkenyl, (2-6C)alkynyl, (1-6C)alkoxy, —NR$_a$R$_b$, aryl or aryloxy group which is optionally substituted with one or more groups selected from halo, (1-4C) alkyl and phenyl.

More suitably, Y is selected from halo, hydride, or a (1-4C)alkyl, (1-5C)alkoxy, —NR$_a$R$_b$, aryl or aryloxy group which is optionally substituted with one or more groups selected from halo, (1-4C)alkyl and phenyl.

Even more suitably, Y is halo, hydride, methyl, n-butyl, —N(CH$_3$)$_2$, —N(C$_6$H$_5$)$_2$, —O-2,6-dimethyl-C$_6$H$_3$), —O-2, 6-diisopropyl-C$_6$H$_3$), —O-2,4-ditertbutyl-C$_6$H$_3$), —O—C(CH$_3$)$_2$CH$_2$CH$_3$.

Yet more suitably, Y is Cl or methyl. Most suitably, Y is methyl.

In another embodiment, Y is selected from halo, hydride, a phosphonated, sulfonated or borate anion, or a (1-6C) alkyl, (2-6C)alkenyl, (2-6C)alkynyl, (1-6C)alkoxy, aryl or aryloxy group which is optionally substituted with one or more groups selected from halo and (1-4C)alkyl.

Suitably, Y is selected from halo, hydride, or a (1-6C) alkyl, (2-6C)alkenyl, (2-6C)alkynyl, (1-6C)alkoxy, aryl or aryloxy group which is optionally substituted with one or more groups selected from halo and (1-4C)alkyl.

More suitably, Y is selected from halo, hydride, or a (1-4C)alkyl, (2-4C)alkenyl, (2-4C)alkynyl, (1-4C)alkoxy, aryl or aryloxy group which is optionally substituted with one or more groups selected from halo and (1-4C)alkyl.

Even more suitably, Y is halo. Yet more suitably, Y is Cl, Br or I. Most suitably, Y is Cl.

In another embodiment, the compound of formula I has a structure according to formula Ia, Ib or Ic shown below:

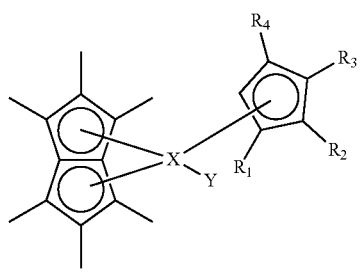

(Ia)

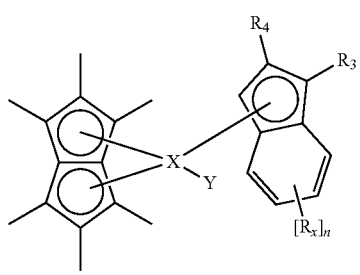

(Ib)

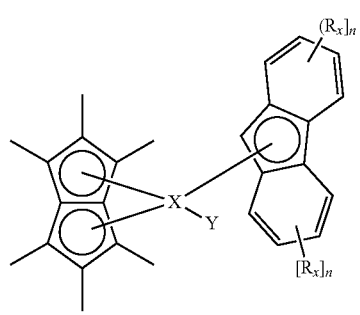

(Ic)

wherein, $R_1$ and $R_2$ are each independently hydrogen or linear (1-4C)alkyl $R_3$ and $R_4$ are each independently hydrogen or linear (1-4C)alkyl each $R_x$ is independently selected from (1-6C)alkyl, (2-6C)alkenyl, (2-6C)alkynyl, (1-6C)alkoxy, aryl, heteroaryl, carbocyclic and heterocyclic, wherein each aryl, heteroaryl, carbocyclic and heterocyclic group is optionally substituted with one or more groups selected from (1-6C)alkyl, (2-6C)alkenyl, (2-6C)alkynyl, (1-6C)alkoxy, halo, amino, nitro, cyano, (1-6C)alkylamino, [(1-6C)alkyl]$_2$amino and —S(O)$_2$(1-6C)alkyl;

each n is independently an integer selected from 0, 1, 2, 3, or 4;

X is Zr or Hf; and

Y is selected from halo, hydride, a phosphonated, sulfonated or borate anion, or a (1-6C)alkyl, (2-6C)alkenyl, (2-6C)alkynyl, (1-6C)alkoxy, —C(O)NR$_a$R$_b$, NR$_a$R$_b$, aryl or aryloxy group which is optionally substituted with one or more groups selected from halo, (1-4C)alkyl, nitro, NR$_a$R$_b$, phenyl, (1-6C)alkoxy, —C(O)NR$_a$R$_b$, or Si[(1-4C)alkyl]$_3$;

wherein R$_a$ and R$_b$ are independently hydrogen or (1-4C) alkyl.

In another embodiment, the compound of formula I has a structure according to formula Ia, Ib or Ic, wherein each $R_x$ is independently selected from (1-6C)alkyl, (2-6C)alkenyl, (2-6C)alkynyl and (1-6C)alkoxy; and each n is independently an integer selected from 0, 1, or 2.

In another embodiment, the compound of formula I has a structure according to formula Ia, Ib or Ic, wherein X is Zr; and Y is selected from halo, hydride, or a (1-6C)alkyl, (2-6C)alkenyl, (2-6C)alkynyl, (1-6C)alkoxy, NR$_a$R$_b$, aryl or aryloxy group which is optionally substituted with one or more groups selected from halo, (1-4C)alkyl or phenyl;

wherein R$_a$ and R$_b$ are independently hydrogen or methyl.

In another embodiment, the compound of formula I has a structure according to formula Ia, Ib or Ic, wherein $R_1$ and $R_2$ are each independently hydrogen or linear (1-2C)alkyl;

$R_3$ and $R_4$ are each independently hydrogen or linear (1-2C)alkyl;

each $R_x$ is independently selected from (1-3C)alkyl, (2-3C)alkenyl, (2-3C)alkynyl and (1-3C)alkoxy;

each n is independently an integer selected from 0, 1 or 2;

X is Zr; and

Y is selected from halo, hydride, or a (1-6C)alkyl, (1-5C) alkoxy or aryloxy group which is optionally substituted with one or more groups selected from halo or (1-4C)alkyl, or Y is a group —N(CH$_3$)$_2$ or —N(C$_6$H$_5$)$_2$.

In another embodiment, the compound of formula I has a structure according to formula Ia, Ib or Ic, wherein $R_1$ and $R_2$ are each independently hydrogen or linear (1-4C)alkyl;

$R_3$ and $R_4$ are each independently hydrogen or linear (1-4C)alkyl; n is 0;

X is Zr or Hf; and

Y is selected from halo, hydride, or a (1-6C)alkyl, (1-5C) alkoxy, or aryloxy group which is optionally substituted with one or more groups selected from halo or (1-4C)alkyl, or Y is a group —N(CH$_3$)$_2$ or —N(C$_6$H$_5$)$_2$.

In another embodiment, the compound of formula I has a structure according to formula Ia, Ib or Ic, wherein $R_1$ and $R_2$ are each independently hydrogen or (1-2C) alkyl;

$R_3$ and $R_4$ are each independently hydrogen or (1-2C) alkyl;

n is 0;

X is Zr or Hf; and

Y is selected from halo, hydride, or a (1-6C)alkyl or aryloxy group which is optionally substituted with one or more groups selected from halo or (1-4C)alkyl, or Y is a group —N(CH$_3$)$_2$ or —N(C$_6$H$_5$)$_2$.

In another embodiment, the compound of formula I has a structure according to formula Ia, Ib or Ic, wherein $R_1$ and $R_2$ are each independently hydrogen, methyl or n-butyl;

$R_3$ and $R_4$ are each independently hydrogen, methyl or n-butyl;

n is 0;

X is Zr or Hf; and

Y is selected from halo, hydride, or a (1-6C)alkyl (e.g. methyl or n-butyl) or aryloxy group which is optionally substituted with one or more groups selected from halo or (1-4C)alkyl, or Y is a group —N(CH$_3$)$_2$ or —N(C$_6$H$_5$)$_2$.

In another embodiment, the compound of formula I has a structure according to formula Ia, Ib or Ic, wherein each $R_x$ is independently selected from (1-6C)alkyl, (2-6C)alkenyl, (2-6C)alkynyl and (1-6C)alkoxy; and each n is independently an integer selected from 0, 1, or 2.

In another embodiment, the compound of formula I has a structure according to formula Ia, Ib or Ic, wherein X is Zr; and Y is selected from halo, hydride, or a (1-6C)alkyl, (2-6C)alkenyl, (2-6C)alkynyl, (1-6C)alkoxy, aryl or aryloxy group which is optionally substituted with one or more groups selected from halo or (1-4C)alkyl.

In another embodiment, the compound of formula I has a structure according to formula Ia, Ib or Ic, wherein $R_1$ and $R_2$ are each independently hydrogen or linear (1-2C)alkyl;

$R_3$ and $R_4$ are each independently hydrogen or linear (1-2C)alkyl;

each $R_x$ is independently selected from (1-3C)alkyl, (2-3C)alkenyl, (2-3C)alkynyl and (1-3C)alkoxy;

each n is independently an integer selected from 0, 1 or 2;

X is Zr; and

Y is selected from halo, hydride, or a (1-6C)alkyl or aryloxy group which is optionally substituted with one or more groups selected from halo or (1-4C)alkyl.

In another embodiment, the compound of formula I has a structure according to formula Ia, Ib or Ic, wherein $R_1$ and $R_2$ are each independently hydrogen or linear (1-4C)alkyl;

$R_3$ and $R_4$ are each independently hydrogen or linear (1-4C)alkyl; n is 0;

X is Zr or Hf; and

Y is selected from halo, hydride, or a (1-6C)alkyl or aryloxy group which is optionally substituted with one or more groups selected from halo or (1-4C)alkyl.

In another embodiment, the compound of formula I has a structure according to formula Ia, Ib or Ic, wherein $R_1$ and $R_2$ are each independently hydrogen or (1-2C) alkyl;

$R_3$ and $R_4$ are each independently hydrogen or (1-2C) alkyl;

n is 0

X is Zr or Hf; and

Y is selected from halo, hydride, or a (1-6C)alkyl or aryloxy group which is optionally substituted with one or more groups selected from halo or (1-4C)alkyl.

In another embodiment, the compound of formula I has a structure according to formula Ia, Ib or Ic, wherein $R_1$ and $R_2$ are each independently hydrogen or methyl;

$R_3$ and $R_4$ are each independently hydrogen or methyl;

n is 0;

X is Zr or Hf; and

Y is selected from halo, hydride, or a (1-6C)alkyl or aryloxy group which is optionally substituted with one or more groups selected from halo or (1-4C)alkyl.

In an embodiment, the compound of formula I has any one of the following structures:

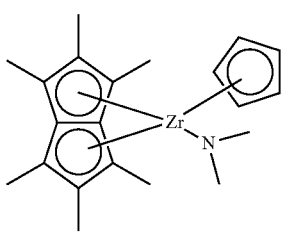

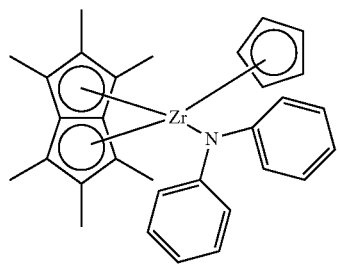

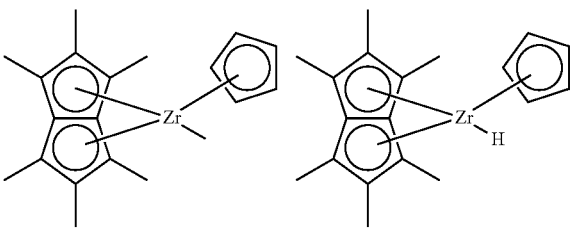

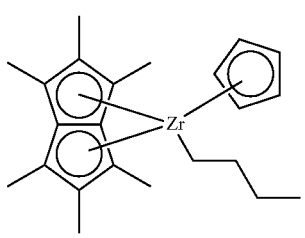

In a particular embodiment, the compound of formula I has any one of the following structures:

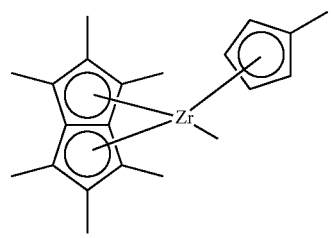

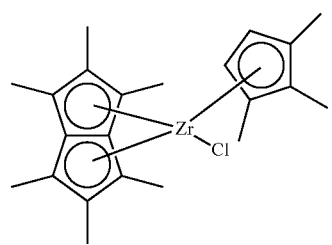

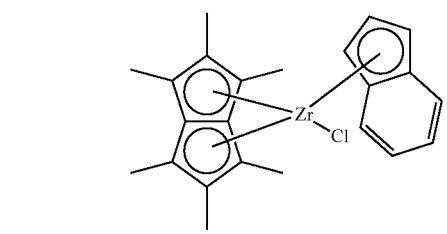

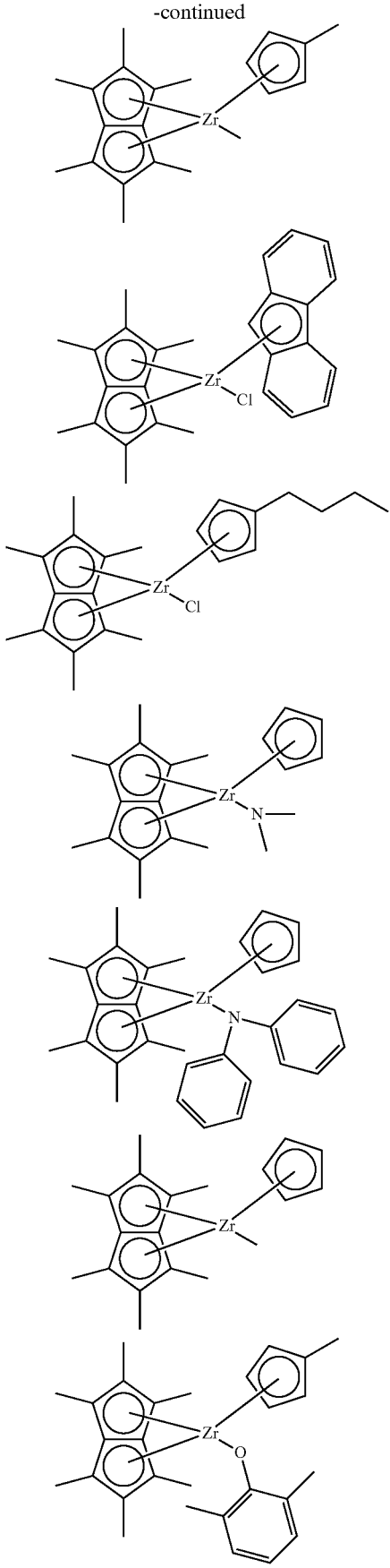
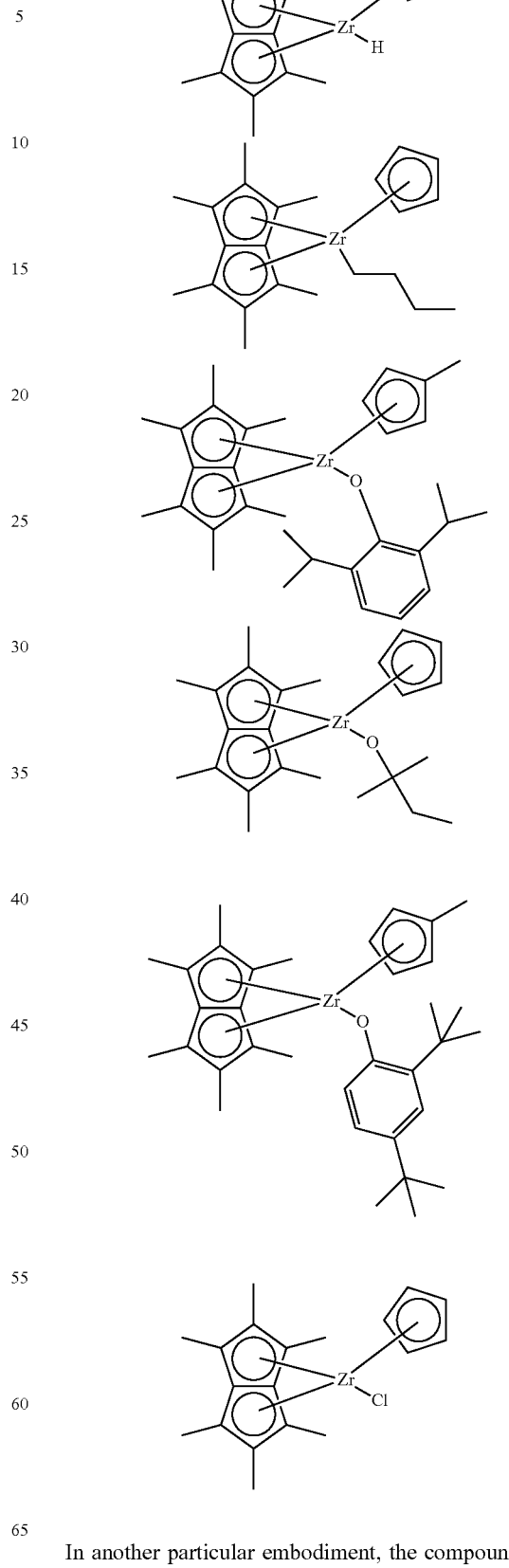
In another particular embodiment, the compound of formula I has any one of the following structures:

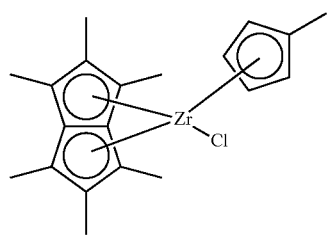
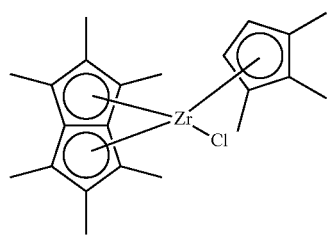
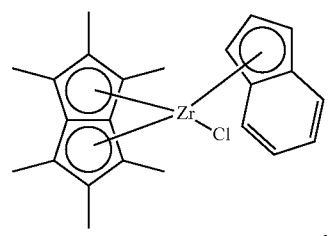
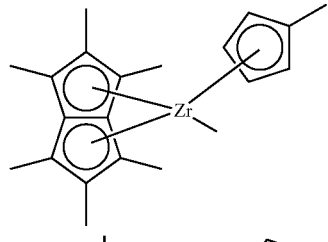
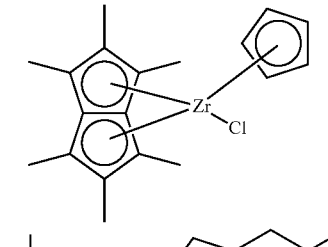
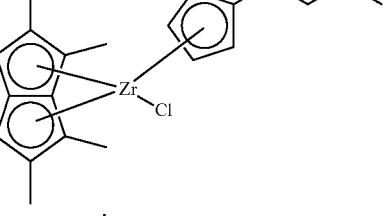
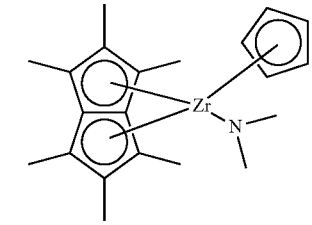
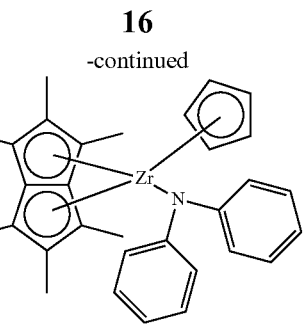
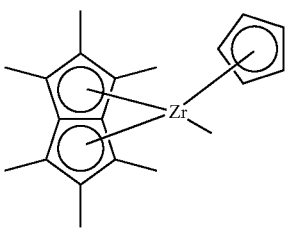
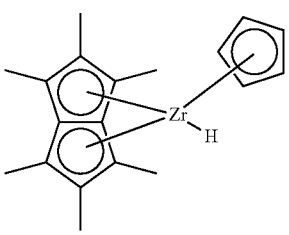
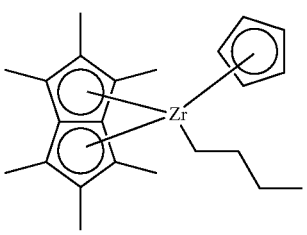
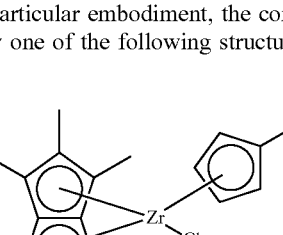
In another particular embodiment, the compound of formula I has any one of the following structures:
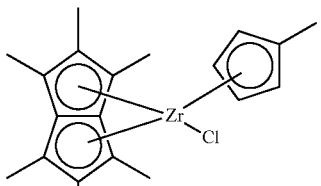
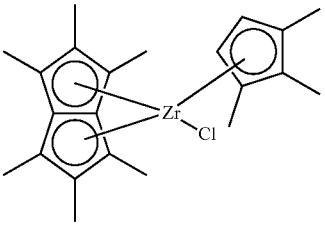

-continued

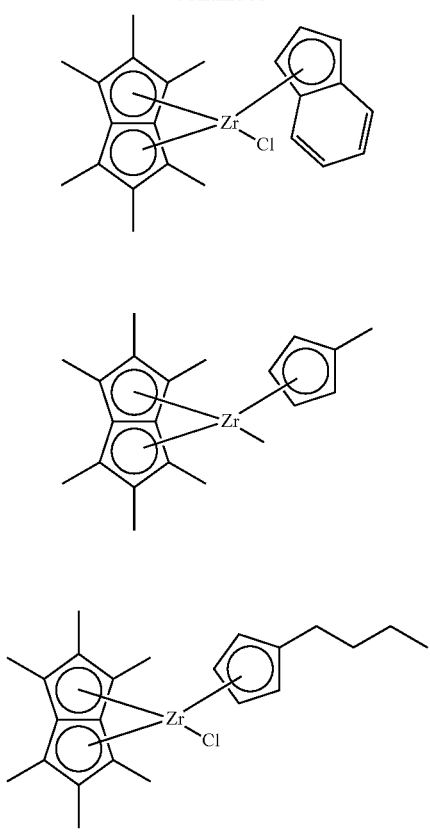

In a particular embodiment, the compound of formula I has any one of the following structures:

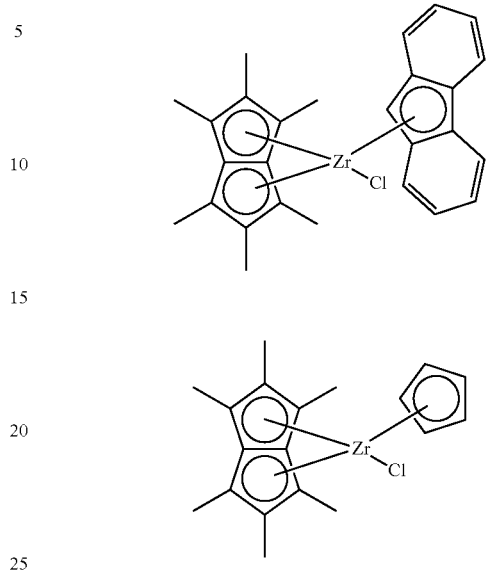

Suitably, the compound of formula I has the following structure:

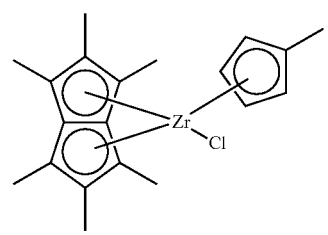

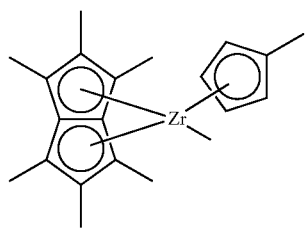

Alternatively, the compound of formula I has either of the following structures:

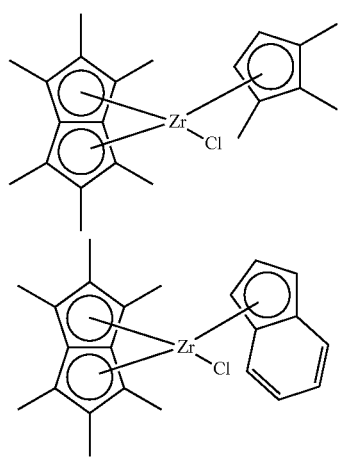

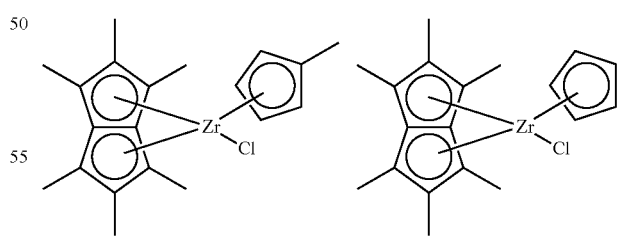

Synthesis

The compounds useful as part of the present invention may be synthesised by any suitable process known in the art. Particular examples of processes for the preparation of the compounds are set out in the accompanying examples.

Suitably, the compounds are prepared according to Scheme 1 below.

Scheme 1: One example of a general synthetic pathway for the synthesis of Pn*ZrCp$^R$Cl

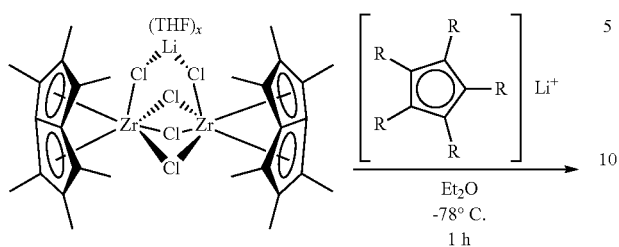

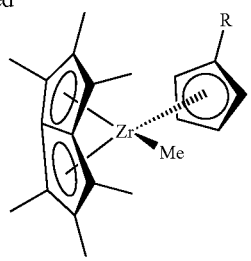

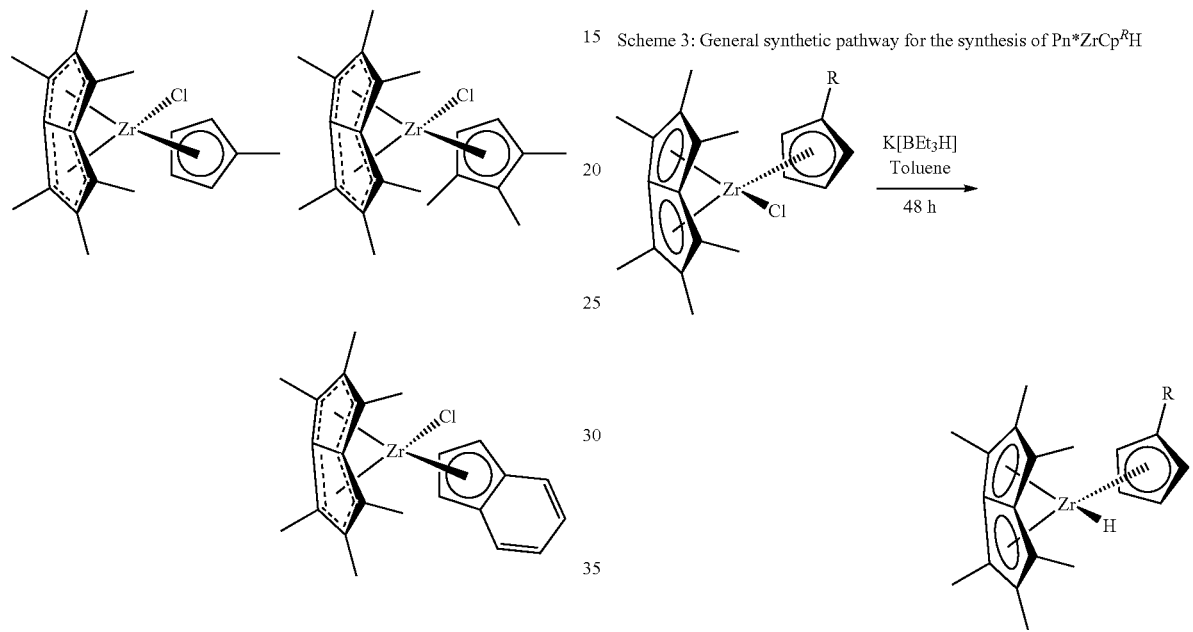

Having regard to Scheme 1 above, it will be understood that the five "R" groups respectively have definitions according to $R_1$, $R_2$, $R_3$, $R_4$ and $R_5$ defined herein. It will be appreciated that "Cl" is only one example of a Y group defined herein, and that the skilled person will readily appreciate how Cl can be exchanged for other Y groups defined herein. Similarly, it will be appreciated that "Li" may be exchanged for an alternative metal. Any suitable solvent may be used. Where necessary, a person of skill in the art will be able to select suitable reaction conditions (e.g. temperature, pressures, reaction times, agitation etc.) for such syntheses.

Exemplary synthetic routes for obtaining other pre-catalysts encompassed by the present invention are outlined in Schemes 2-8 below.

Scheme 2: General synthetic pathway for the synthesis of Pn*ZrCp$^R$(Me)

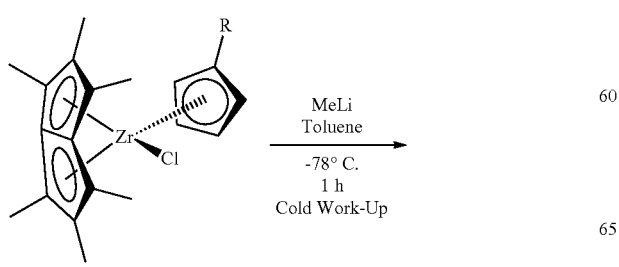

Scheme 4: General synthetic pathway for the synthesis of Pn*ZrCp$^R$(nBu).

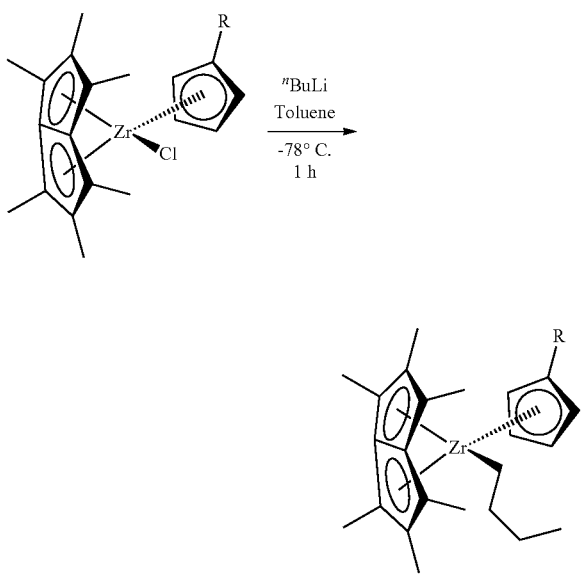

Scheme 5: General synthetic pathway for the synthesis of Pn*ZrCp$^R$(NR'$_2$).

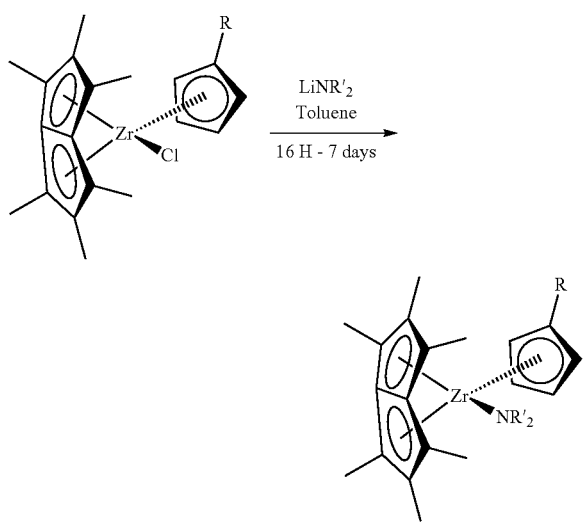

Scheme 6: General synthetic pathway for the synthesis of Pn*ZrCp$^R$ (O-2,6-R'-C$_6$H$_3$).

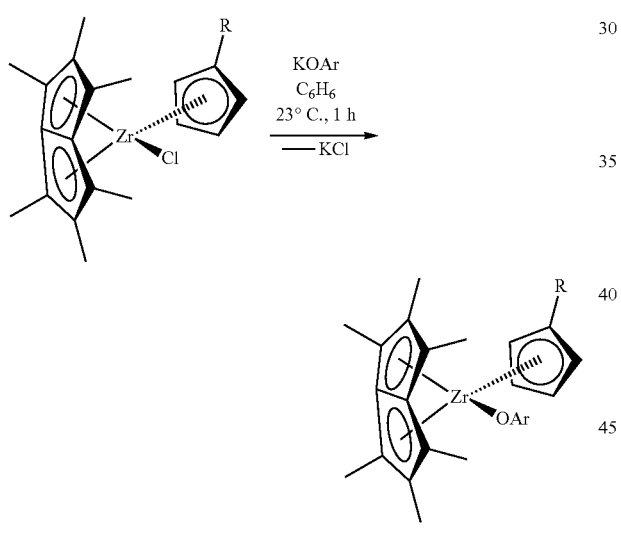

OAr =

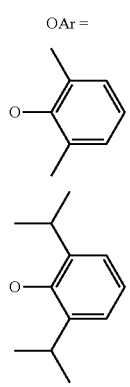

Scheme 7: Synthetic pathway for the synthesis of Pn*ZrCp$^{Me}$(O-2,4-tBu-C$_6$H$_3$).

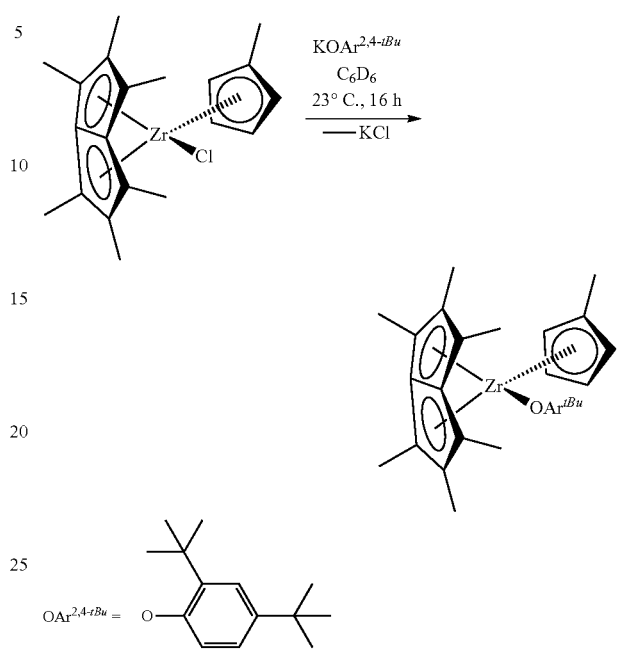

Scheme 8: Synthetic pathway for the synthesis of Pn*ZrCp$^{Me}$(OCMe$_2$Et)

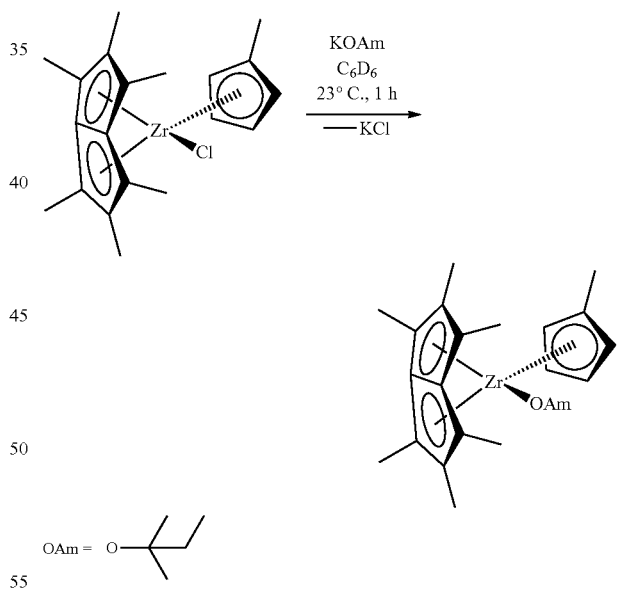

Once prepared, the compounds of formula may be converted into a composition of the invention by, for example, contacting the compounds of formula (I) with solid MAO as defined herein in a suitable solvent (e.g. toluene) with optional heating, and then isolating the resulting solid.

Exemplary processes for the preparation of compounds of formula (I) of the invention are set out in the accompanying examples.

Also described herein is a composition defined herein, obtainable, obtained or directly obtained by a process defined herein.

Applications

As discussed hereinbefore, the compositions of the invention are effective catalysts/initiators in the polymerisation of olefins.

Thus, as discussed hereinbefore, the present invention also provides a use of a composition defined herein in the polymerisation of olefins.

In one embodiment, the olefins are all ethene (ethylene), thus resulting in a polyethylene homopolymer.

In another embodiment, the olefins are different, thus resulting in a copolymer. In an embodiment, the mixture of olefins contains 90-99 wt % of ethene monomers and 1-10 wt % of (4-8C) α-olefin. Suitably, the (4-8C) α-olefin is 1-butene, 1-hexene, 1-octene, or a mixture thereof.

As discussed hereinbefore, the present invention also provides a process for polymerising one or more olefins, said process comprising the step of polymerising the one or more olefins in the presence of:

(i) a composition defined herein; and
(ii) a suitable activator.

Suitable activators are well known in the art and include organo aluminium compounds (e.g. alkyl aluminium compounds). Particularly suitable activators include aluminoxanes (e.g. methylaluminoxane (MAO)), triisobutylaluminium (TIBA), diethylaluminium (DEAC) and triethylaluminium (TEA).

In another embodiment, the olefins are ethene monomers, thus resulting in a polyethylene homopolymeric product.

In another embodiment, the olefins are a mixture of olefins, thus resulting in a copolymeric product. The mixture of olefins may contain 90-99 wt % of ethene monomers and 1-10 wt % of (4-8C) α-olefin. Suitably, the (4-8C) α-olefin is 1-butene, 1-hexene, 1-octene, or a mixture thereof.

A person skilled in the art of olefin polymerization will be able to select suitable reaction conditions (e.g. temperature, pressures, reaction times etc.) for such a polymerization reaction. A person skilled in the art will also be able to manipulate the process parameters in order to produce a polyolefin having particular properties.

In an embodiment, the process is conducted at a temperature of 30-90° C. Suitably, the process is conducted at a temperature of 35-65° C.

The suitable activator forming part of the process may have any of those definitions appearing hereinbefore in relation to the compositions of the invention. It will be appreciated that the suitable activator forming part of the process may be inherently present within the composition itself, such that the process is conducted in the presence of only 1 type of activator. Alternatively, the suitable activator forming part of the process may be present in addition to the activator inherently present within the composition, such that the process is in fact conducted in the presence of 2 types of activator. Either activator may take the form of an oxygen scavenging species.

EXAMPLES

Examples of the invention will now be described, for the purpose of illustration only, by reference to the accompanying figures, in which:

FIG. 1 shows A) the molecular structures of (left) Pn*ZrCp$^{1,2,3\text{-}Me}$Cl; (right) Pn*ZrIndCl as determined by X-ray crystallography. Thermal ellipsoids shown at 50% probability; B) molecular structures of a) Pn*ZrCp$^{Me}$Cl, b) Pn*ZrCp$^{tBu}$Cl, c) Pn*ZrCp$^{Me3}$Cl, d) Pn*ZrCp$^{nBu}$Cl, e) Pn*ZrIndCl, f) Pn*ZrCpMe, g) Pn*ZrCp$^{Me}$(Me), h) Pn*ZrCp(NMe$_2$), i) Pn*ZrCp(NPh$_2$), j) Pn*ZrCp$^{Me}$(O-2,6-Me-C$_6$H$_3$) and k) Pn*ZrCp(H) as determined by X-ray crystallography.

Figure 4:
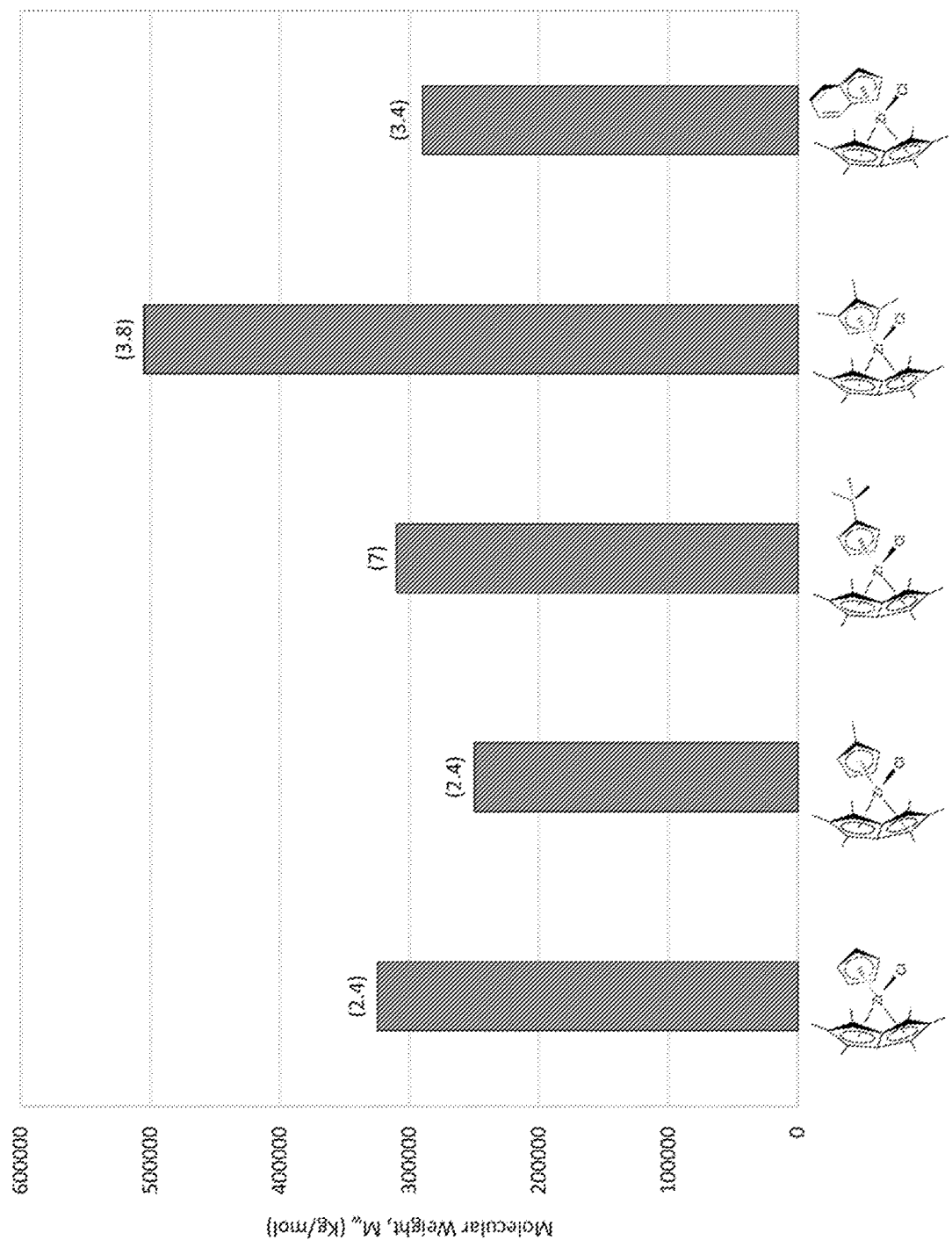

FIG. 4 shows polymer molecular weight, $M_w$ for polymethylaluminoxane supported ethylene polymerization at 60° C. with Pn*ZrCp$^R$Cl (Cp$^R$=Cp, Cp$_{Me}$, Cp$^{tBu}$, Cp$^{Me3}$, Ind). PDIs are given in parentheses. Polymerisation conditions [Zr]:[sMAO]=1:200; 150 mg TiBA co-catalyst; 2 bar ethylene; 10 mg catalyst loading; 50 mL toluene; 60° C.; 30 minutes.

Figure 5:
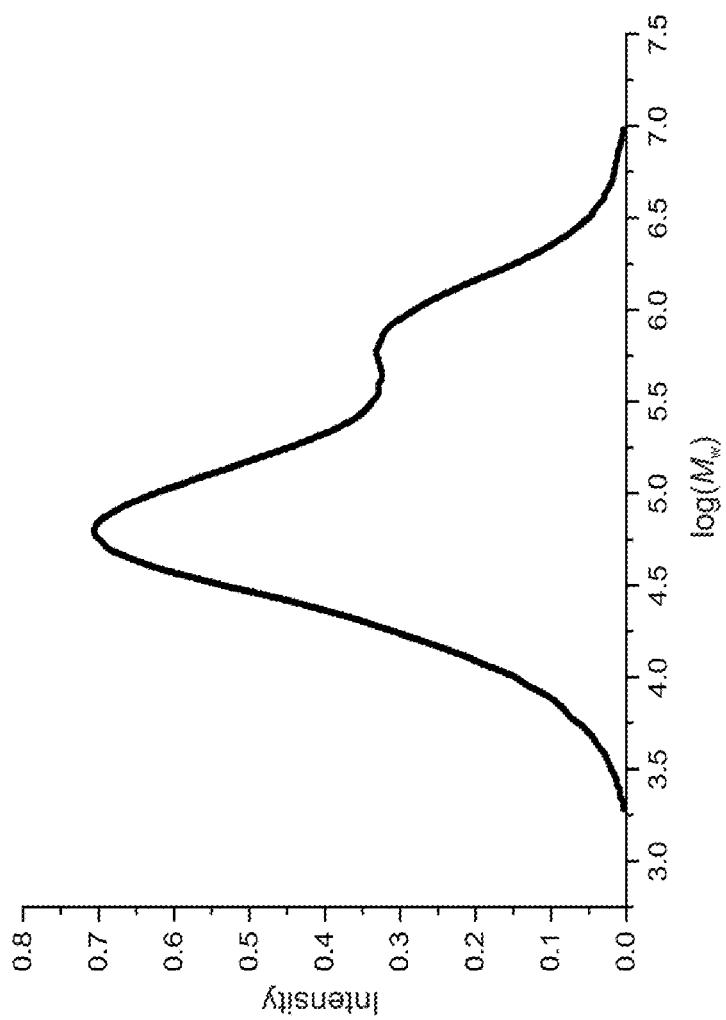

FIG. 5 shows molecular weight distribution of polymer produced by polymethylaluminoxane-supported Pn*ZrCp$^{tBu}$Cl determined by GPC.

Figure 6:
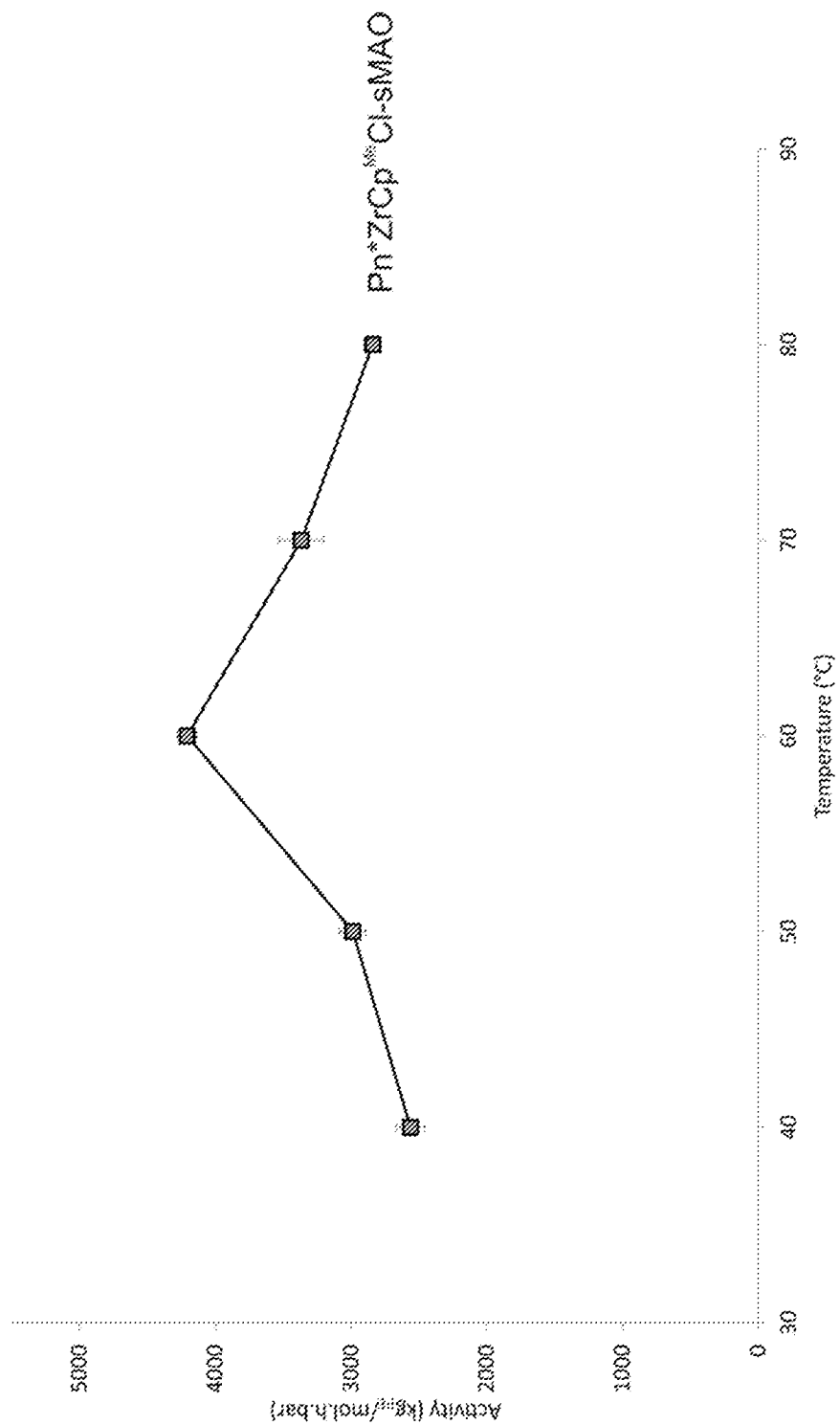

FIG. 6 shows the temperature dependence of ethylene polymerization activity with Pn*ZrCp$^{Me}$Cl. Polymerisation conditions [Zr]:[sMAO]=1:200; 150 mg TiBA co-catalyst; 2 bar ethylene; 10 mg catalyst loading; 50 mL toluene; 30 minutes.

Figure 7:
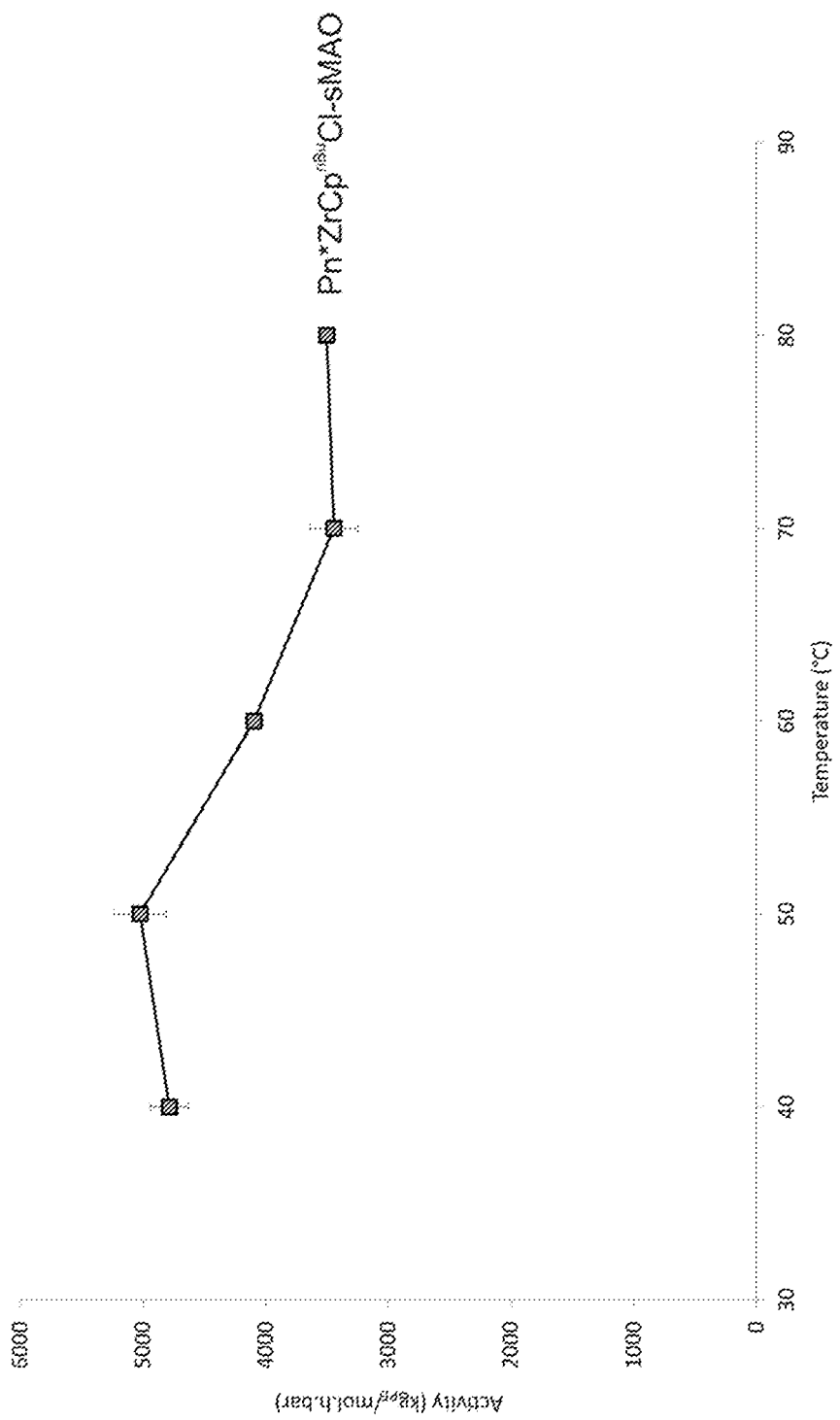

FIG. 7 shows the temperature dependence of ethylene polymerization activity with Pn*ZrCp$^{nBu}$Cl. Polymerisation conditions [Zr]:[sMAO]=1:200; 150 mg TiBA co-catalyst; 2 bar ethylene; 10 mg catalyst loading; 50 mL toluene; 30 minutes.

Figure 8:
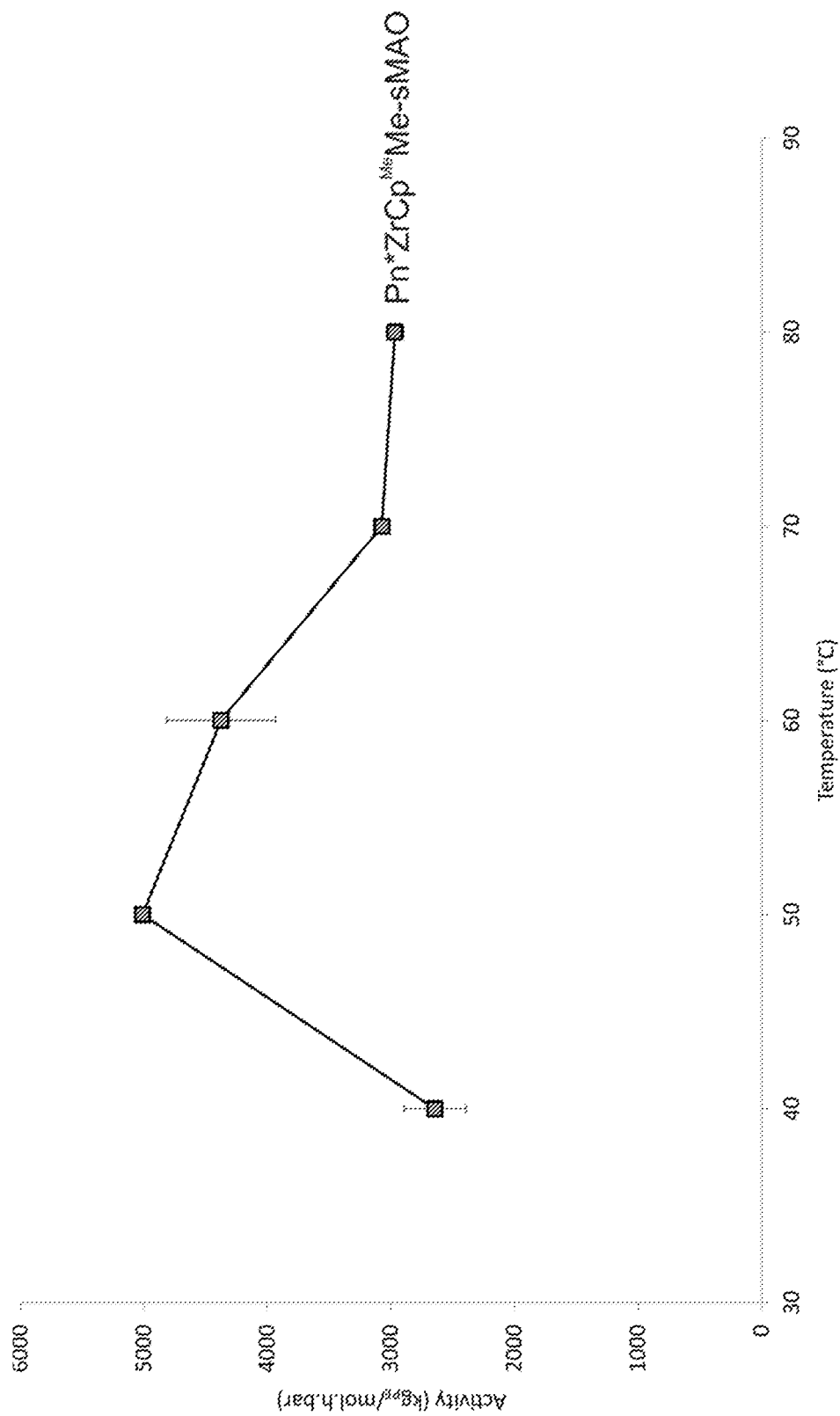

FIG. 8 shows the temperature dependence of ethylene polymerization activity with Pn*ZrCp$^{Me}$(Me). Polymerisation conditions [Zr]:[sMAO]=1:200; 150 mg TiBA co-catalyst; 2 bar ethylene; 10 mg catalyst loading; 50 mL toluene; 30 minutes.

Figure 9:
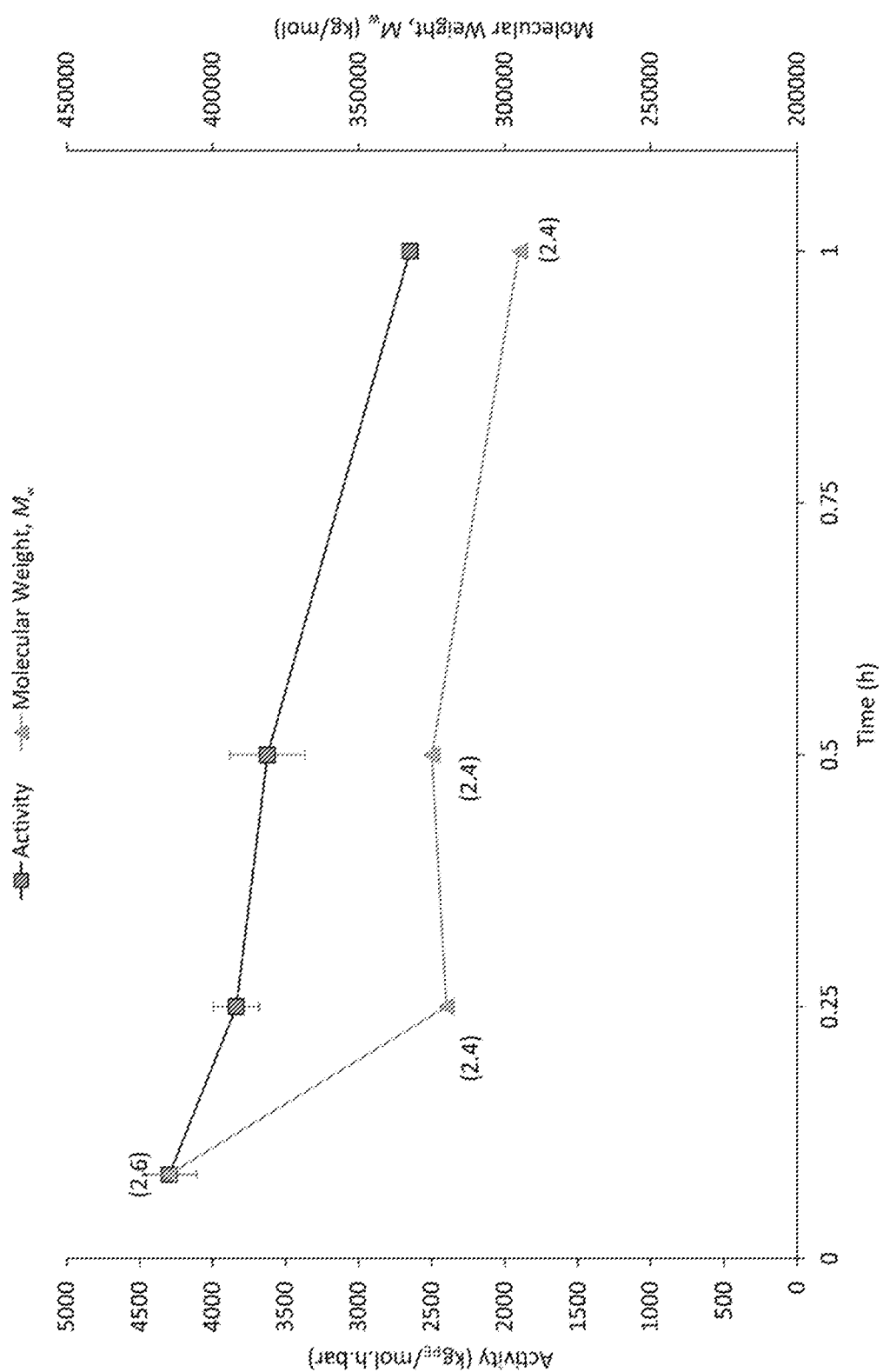

FIG. 9 shows the time dependence of ethylene polymerization activity and polymer molecular weight, $M_w$ with polymethylaluminoxane supported pre-catalyst, Pn*ZrCpCl. PDIs are given in parentheses. Polymerisation conditions [Zr]:[sMAO]=1:200; 150 mg TiBA co-catalyst; 2 bar ethylene; 10 mg catalyst loading; 50 mL toluene; 60° C.

Figure 10:
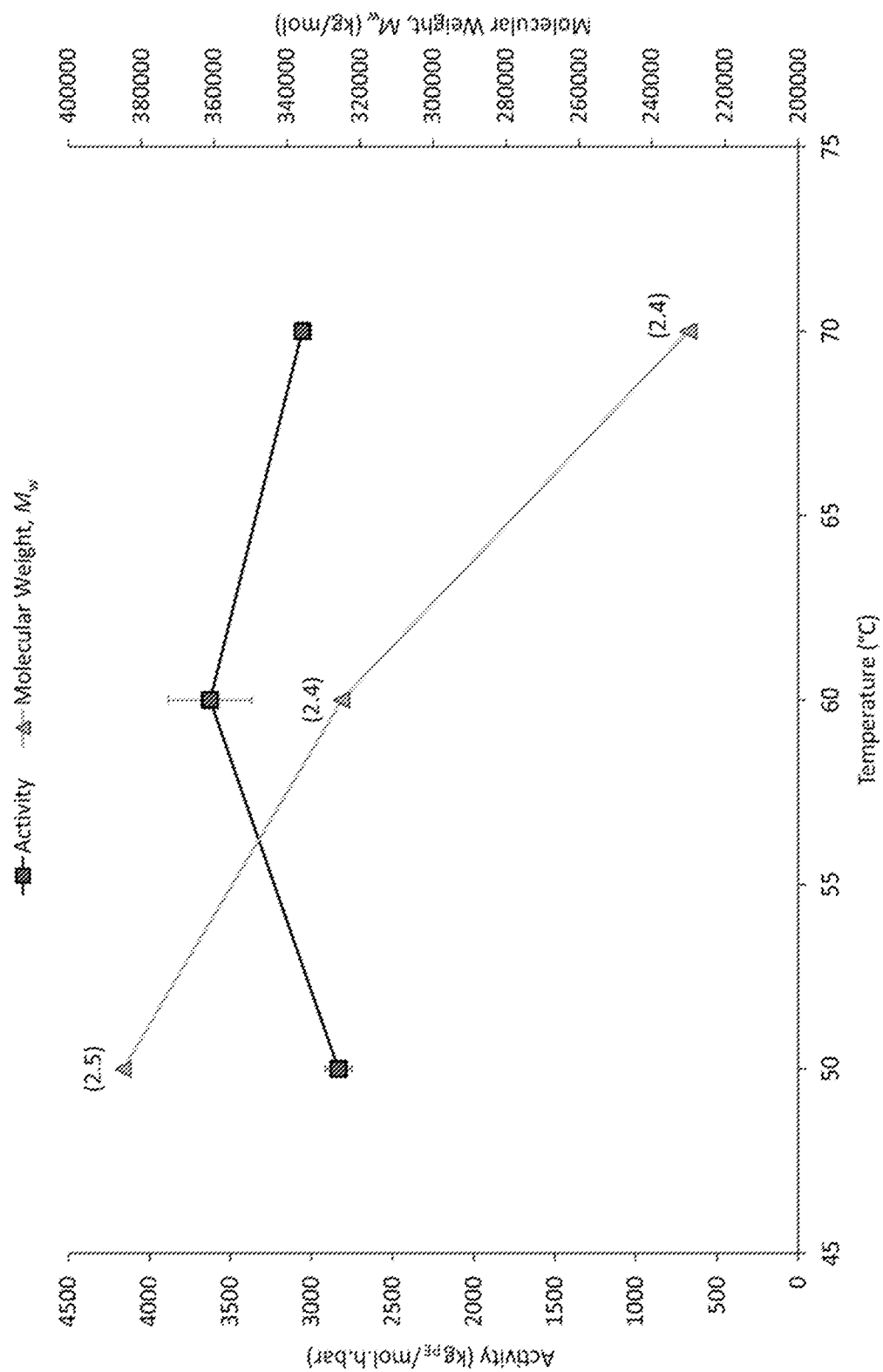

FIG. 10 shows the temperature dependence of ethylene polymerization activity and polymer molecular weight, $M_w$ with polymethylaluminoxane supported pre-catalyst, Pn*ZrCpCl. PDIs are given in parentheses. Polymerisation conditions [Zr]:[sMAO]=1:200; 150 mg TiBA co-catalyst; 2 bar ethylene; 10 mg catalyst loading; 50 mL toluene.

Figure 11:
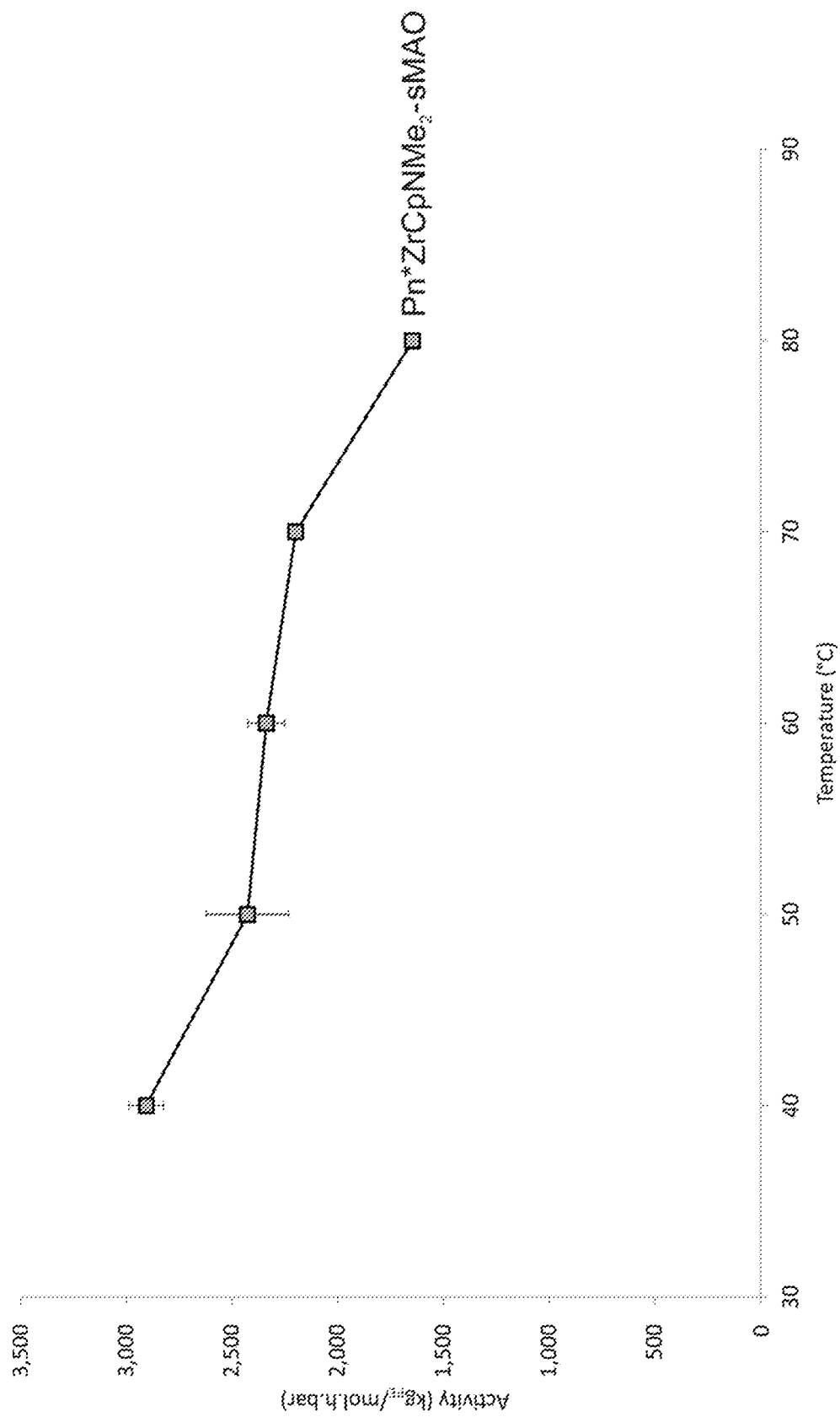

FIG. 11 shows the temperature dependence of ethylene polymerization activity with Pn*ZrCp(NMe$_2$). Polymerisation conditions [Zr]:[sMAO]=1:200; 150 mg TiBA co-catalyst; 2 bar ethylene; 10 mg catalyst loading; 50 mL toluene; 30 minutes.

Figure 12:
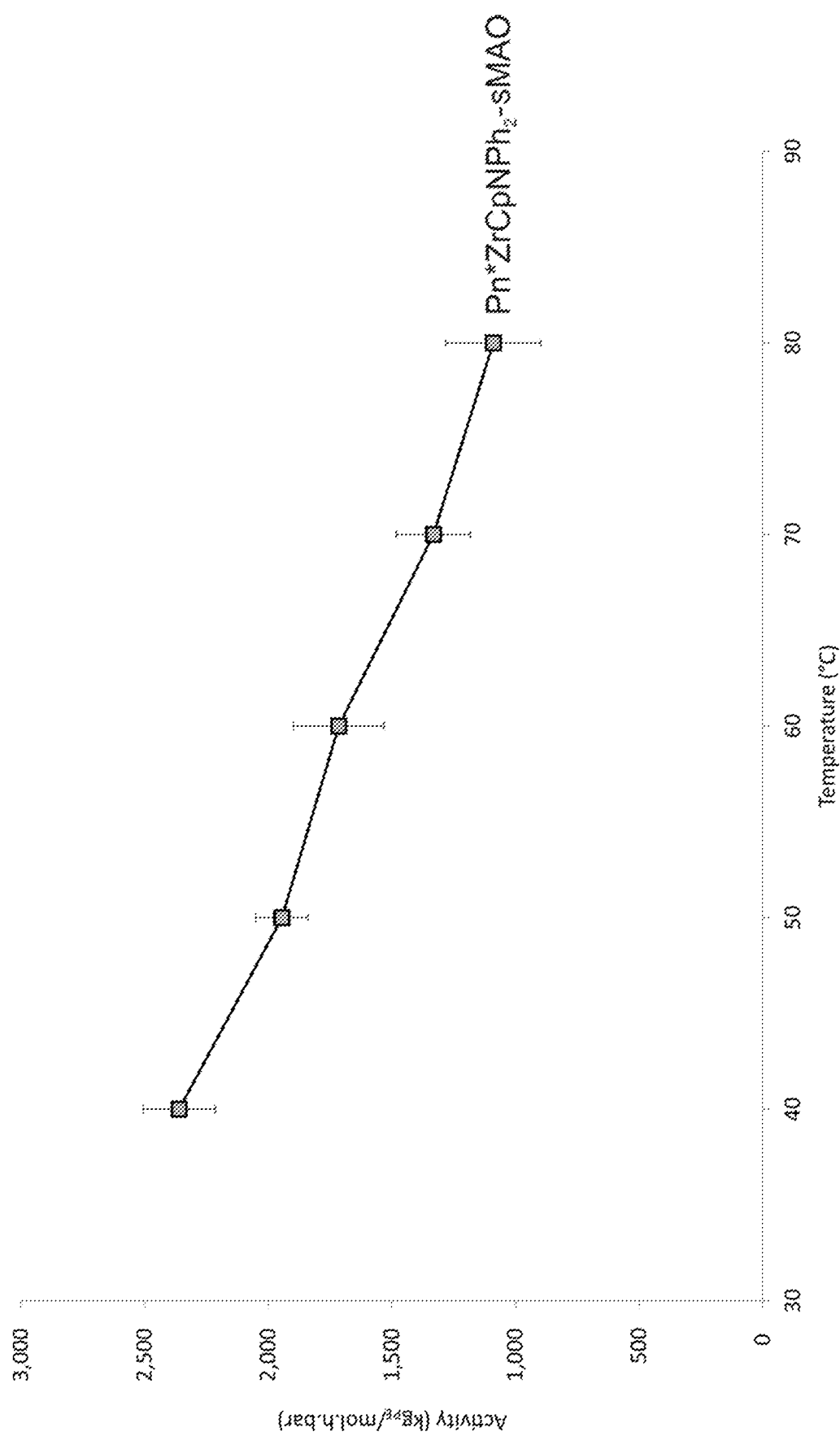

FIG. 12 shows the temperature dependence of ethylene polymerization activity with Pn*ZrCp(NPh$_2$). Polymerisation conditions [Zr]:[sMAO]=1:200; 150 mg TiBA co-catalyst; 2 bar ethylene; 10 mg catalyst loading; 50 mL toluene; 30 minutes.

Figure 13:
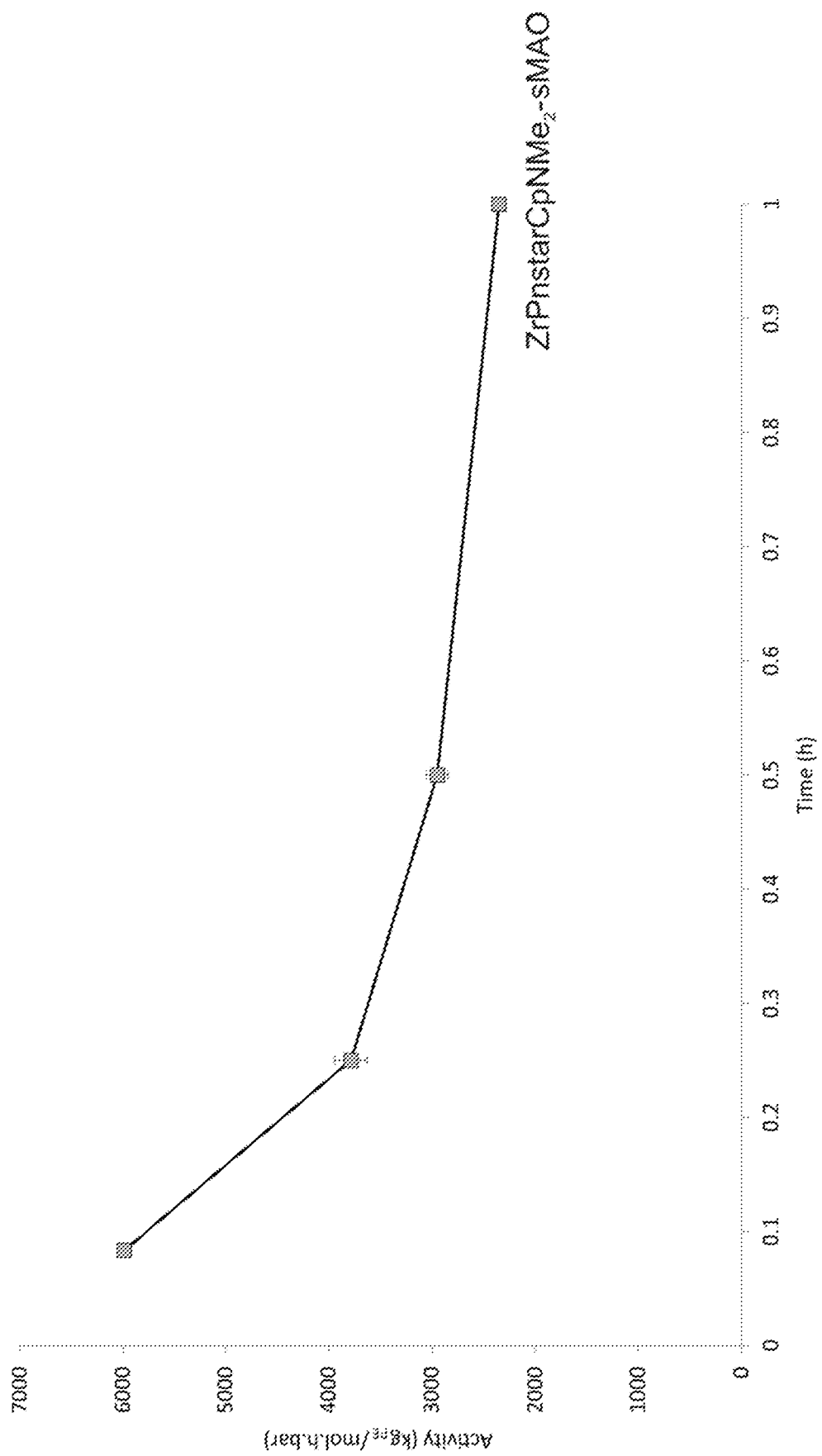

FIG. 13 shows the time dependence of ethylene polymerization activity with polymethylaluminoxane supported pre-catalyst, Pn*ZrCp(NMe$_2$). Polymerisation conditions [Zr]:[sMAO]=1:200; 150 mg TiBA co-catalyst; 2 bar ethylene; 10 mg catalyst loading; 50 mL toluene; 40° C.

Figure 14:
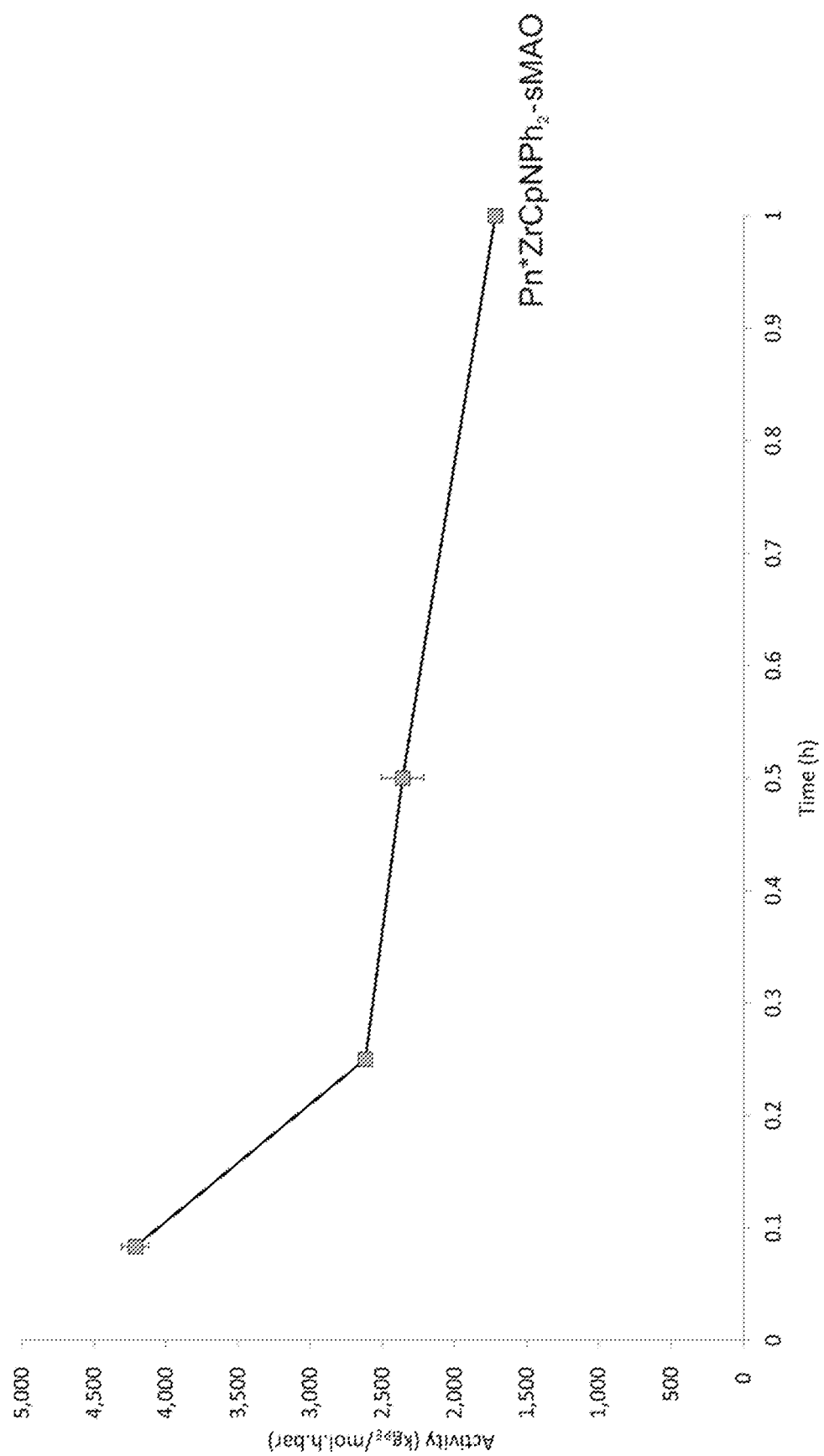

FIG. 14 shows the time dependence of ethylene polymerization activity with polymethylaluminoxane supported pre-catalyst, Pn*ZrCp(NPh$_2$). Polymerisation conditions [Zr]:[sMAO]=1:200; 150 mg TiBA co-catalyst; 2 bar ethylene; 10 mg catalyst loading; 50 mL toluene; 40° C.

Figure 15:
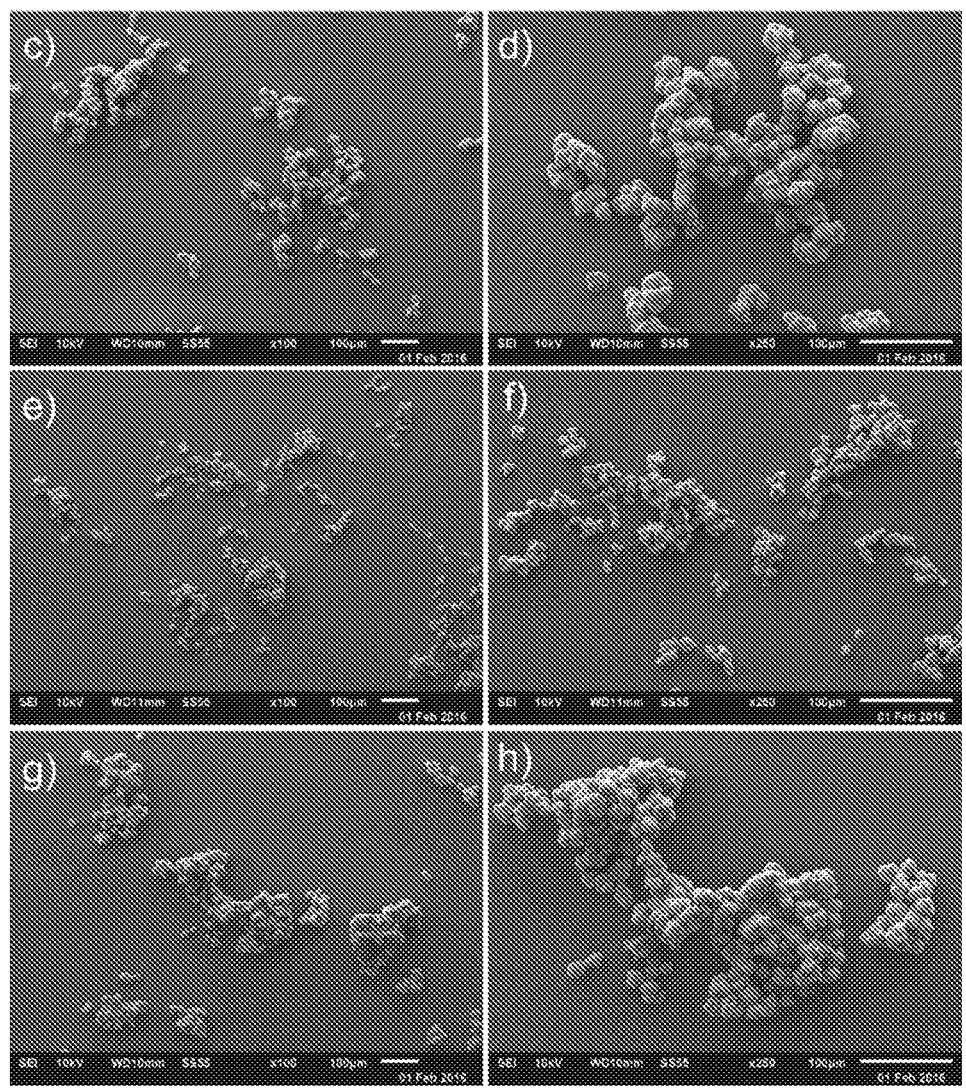

FIG. 15 shows SEM of polymer produced by slurry-phase polymerization of ethylene using c) Pn*ZrCp$^{Me}$Cl at ×100 magnification; d) Pn*ZrCp$^{Me}$Cl at ×250 magnification; e) Pn*ZrCp$^{tBu}$Cl at ×100 magnification; f) Pn*ZrCp$^{tBu}$Cl at ×250 magnification g) Pn*ZrIndCl at ×100 magnification; and h) Pn*ZrIndCl at ×250 magnification. Slurry phase polymerisation conditions: [Zr]:[sMAO]=1:200; 150 mg TiBA co-catalyst; 2 bar ethylene; 10 mg catalyst loading; 50 mL toluene; 30 minutes.

EXAMPLE 1—SYNTHESIS OF PRE-CATALYST

Example 1a—Synthesis of Pn*ZrCp$^{Me}$Cl

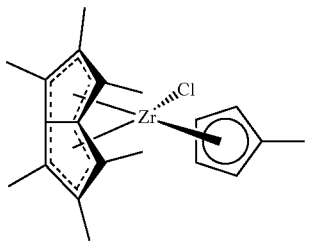

[ZrPn*(μ-Cl)$_{3/2}$]$_2$(μ—Cl)$_2$Li.Et$_2$O$_{(1.21)}$ (300 mg, 0.362 mmol) was dissolved in Et$_2$O (20 mL) and cooled to −78° C. Et$_2$O (15 mL) was added to LiCp$^{Me}$ (62.3 mg, 0.724 mmol), cooled to −78° C. and the contents slurried onto the solution of [ZrPn*(μ-Cl)$_{3/2}$]$_2$(μ—Cl)$_2$Li.Et$_2$O$_{(1.21)}$. The schlenk was allowed to warm to room temperature over the course of an hour, and then stirred for a further hour. The Et$_2$O was then removed under vacuum, and the solids dissolved sparingly in benzene (3×2 mL) before being filtered into a small schlenk. The benzene was frozen at −78° C., removed from the cold bath, and exposed to dynamic vacuum overnight causing the solvent to sublime. The solid was then washed with −78° C. pentane (2×3 mL) and dried under vacuum for 4 h giving the product in 54% yield (152 mg, 0.388 mmol).

$^1$H NMR (C$_6$D$_6$) δ(ppm): 1.66 {(2,6)-Me$_2$, 6H, s}; 1.81 {(3,5)-Me$_2$, 6H, s}; 2.12 {(1,7)-Me$_2$, Cp-Me, 9H, s); 5.13 {Cp(2,5)-CH, 2H, t ($^3$J$_{H-H}$=2.6 Hz)}; 5.59 {Cp(3,4)-CH, 2H, t ($^3$J$_{H-H}$=2.6 Hz)}

$^{13}$C NMR (C$_6$D$_6$) δ(ppm): 10.8 {(2,6)-Me$_2$}; 12.4 {(1,7)-Me$_2$}; 13.0 {(3,5)-Me$_2$}; 14.5 (Cp-Me); 106.1 {Cp(2,5)}; 113.6 {Cp(3,4)} 124.3 (Cp(1)}

Example 1b—Synthesis of ZrPn*Cp$^{Me3}$Cl

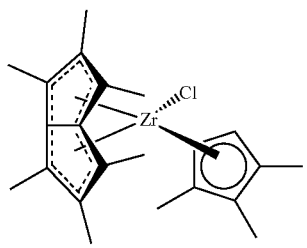

[ZrPn*(μ-Cl)$_{3/2}$]$_2$(μ-Cl)$_2$Li.THF$_{(1.02)}$ (250 mg, 0.308 mmol) was dissolved in Et$_2$O (20 mL) and cooled to −78° C. A slurry of 1,2,3-CpMe$_3$ (70.2 mg, 0.615 mmol) in −78° C. Et$_2$O (15 mL) was transferred to this solution via cannula and the contents stirred at this temperature for 1 h. The schlenk was then slowly warmed to room temperature before being stirred for a further hour. The solvent was removed in vacuo, the contents dissolved in benzene (3×2 mL) and filtered via cannula into a small schlenk. This solution was frozen at −78° C., exposed to dynamic vacuum, then removed from the cool bath to allow the benzene to sublime overnight. This solid was washed with −78° C. pentane (2×3 mL) and dried under vacuum overnight giving the product as a light tan powder in 53% yield (137 mg, 0.326 mmol).

$^1$H NMR (C$_6$D$_6$) δ(ppm): 1.64 {(2,6)-Me$_2$, 6H, s}; 1.76 {Cp(1,3)-Me$_2$, 6H, s}; 1.90 {(3,5)-Me$_2$, 6H, s}; 2.03 {Cp(2)-Me, 3H, s}; 2.14 {(1,7)-Me$_2$, 6H, s}; 4.82 {Cp(4,5)-CH}

$^{13}$C NMR (C$_6$D$_6$) δ(ppm): 10.5 {(2,6)-Me$_2$}; 11.8 {(Cp(2)-Me$_2$}; 12.1 {Cp(1,3)-Me$_2$}; 12.6 {(1,7)-Me$_2$}; 13.2 {(3,5)-Me$_2$}; 104.2 (3,5); 105.1 {Cp(4,5)}; 112.1 (1,7); 118.9 {Cp(1,3)}; 119.3 (4); 125.1 (2,6); 126.8 (8); 127.3 {Cp(2)}

Example 1c—Synthesis of ZrPn*IndCl

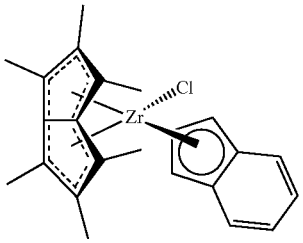

[ZrPn*(μ-Cl)$_{3/2}$]$_2$(μ—Cl)$_2$Li.THF$_{(1.02)}$ (300 mg, 0.369 mmol) was dissolved in Et$_2$O (20 mL) and cooled to −78° C. A slurry of IndLi (90.1 mg, 0.738 mmol) was transferred to this solution via cannula and the contents stirred for 1 h. The vessel was allowed to warm to room temperature, then stirred for a further hour, before the solvent was removed under vacuum. The solid was redissolved sparingly in benzene (3×2 mL) and filtered via cannula into a small schlenk. The solvent was frozen at −78° C., removed from the cold bath, and exposed to dynamic vacuum overnight. The resultant powder was washed with −78° C. pentane (3×2 mL) and dried under vacuum for 4 hours giving the product as an orange-green powder in 75% yield (239 mg, 0.558 mmol).

$^1$H NMR (C$_6$D$_6$) δ(ppm): 1.49 {(2,6)-Me$_2$, 6H,s}; 1.91 {(3,5)-Me$_2$, 6H, s}; 1.94 {(1,7)-Me$_2$, 6H, s}; 5.51 {Ind(2,9), 2H, d ($^3$J$_{H-H}$=3.4 Hz)}; 5.78 {Ind(1), 1H, t ($^3$J$_{H-H}$=3.4 Hz)}; 6.93 {Ind(5,6), 2H, m}; 7.51 {Ind(4,7), 2H, m}

$^{13}$C NMR (C$_6$D$_6$) δ(ppm): 10.4 {(2,6)-Me$_2$}; 12.5 {(3,5)-Me$_2$}; 13.1 {(1,7)-Me$_2$}; 95.2 {Ind(2,9)}; 105.8 (3,5); 112.4 (1,7); 119.1 {Ind(1)}; 119.8 (4); 123.4 {Ind(4,7)}; 124.0 {Ind(5,6)}; 126.3 (2,6); 126.5 {Ind(3,8); 128.6 (8)

Example 1d—Synthesis of Pn*ZrCp$^{nBu}$Cl

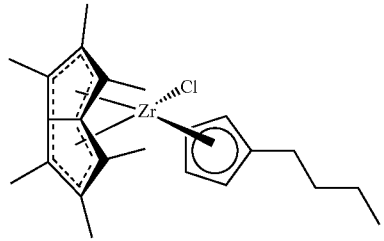

LiCp$^{nBu}$ (79 mg, 0.617 mmol) was ground with an agate pestle and mortar and added to an ampoule containing [Pn*Zr(μ—Cl)$_{3/2}$]$_2$(μ—Cl)$_2$Li.thf$_{(0.988)}$ (250 mg, 0.308 mmol). Et$_2$O (20 mL) was cooled to −78° C. and transferred onto the solids and stirred vigorously for 1 h. The ampoule was removed from the cold bath and sonicated for 1 h. The reaction mixture was then stirred for a further hour at room temperature before the solvent was removed under vacuum to afford an orange oil that crystallizes slowly on standing. Following extraction into benzene (3×2 mL) and lyophilization, Pn*ZrCp$^{nBu}$Cl was afforded as a brown solid in 67% yield (179 mg, 0.412 mmol).

Single crystals suitable for an X-ray diffraction study were grown from a saturated (Me$_3$Si)$_2$O solution at −35° C. Anal Calcd (found) for C$_{23}$H$_{31}$ClZr: C, 63.63 (63.71); H, 7.20 (7.21).

$^1$H NMR (400 MHz, C$_6$D$_6$) δ(ppm): 0.87 (t, 3H, $^3J_{H-H}$=7.2 Hz, CH$_3$(CH$_2$)$_3$-Cp); 1.30 (m, 2H, CH$_3$CH$_2$(CH$_2$)$_2$-Cp); 1.42 (m, 2H, CH$_3$CH$_2$CH$_2$CH$_2$-Cp); 1.70 (s, 6H, 2,6-Me-Pn*); 1.84 (s, 6H, 3,5-Me-Pn*); 2.11 (s, 6H, 1,7-Me-Pn*); 2.6 (m, 2H,CH$_3$CH$_2$CH$_2$CH$_2$-Cp); 5.15 (t, 2H, $^3J_{H-H}$=2.7 Hz, 3,4-H-Cp); 5.68 (t, 2H, $^3J_{H-H}$=2.7 Hz, 2,5-H-Cp).

$^{13}$C{$^1$H} NMR (100 MHz, C$_6$D$_6$) δ(ppm): 11.3 (2,6-Me-Pn*); 12.6 (1,7-Me-Pn*); 13.3 (3,5-Me-Pn*); 14.3 (CH$_3$CH$_2$CH$_2$CH$_2$-Cp); 23.0 (CH$_3$CH$_2$(CH$_2$)-Cp); 29.3 (CH$_3$CH$_2$CH$_2$CH$_2$-Cp); 33.8 (Cp-CH$_2$—CH$_2$—); 105.2 (3,5-Pn*); 106.0 (3,4-Cp); 112.2 (1,7-Pn*); 113.4 (2,5-Cp); 119.5 (4-Pn*); 125.6 (2,6-Pn*); 128.6 (8-Pn*); 130.0 (1-Cp).

Example 1e—Synthesis of Pn*Cp$^{Me}$(Me)

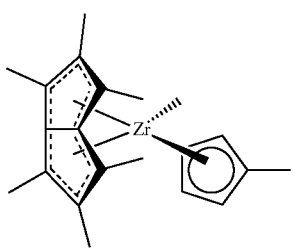

A solution of Pn*ZrCp$^{Me}$Cl (200 mg, 0.510 mmol) in toluene (15 mL) at −78° C. was added to a solution of MeLi (1.6 M in Et$_2$O, 319 μL, 0.510 mmol) in toluene at −78° C. Thea reaction mixture was stirred for 1 h before being exposed to dynamic vacuum while still in the cold bath. The solution was removed from the cold bath so that the removal of the solvent kept the temperature below 0° C. The solid was extracted with hexane (4×5 mL) and the combined extracts concentrated to 15 mL and cooled to −80° C. in a freezer overnight, yielding a yellow microcrystalline solid. The supernatant was removed and the solid dried in vacuo for 4 h to yield Pn*ZrCp$^{Me}$(Me) in 50% yield (95 mg, 0.256 mmol).

Single crystals suitable for an X-ray diffraction study were grown from slow-evaporation of a benzene solution. Anal Calcd (found) for C$_{21}$H$_{28}$Zr: C, 67.86 (67.73); H, 7.59 (7.71).

$^1$H NMR (400 MHz, C$_6$D$_6$) δ(ppm): −0.74 (s, 3H, Zr-Me); 1.63 (s, 6H, 2,6-Me-Pn*); 1.85 (s, 3H, Me-Cp, 3H, s); 1.99 (s, 6H, 3,5-Me-Pn*); 2.00 (s, 6H, 1,7-Me-Pn*); 5.15 (t, 2H, $^3J_{H-H}$=2.6 Hz, 2,5-H-Cp); 5.37 (t, 2H, $^3J_{H-H}$=2.6 Hz, 3,4-H-Cp).

$^{13}$C{$^1$H} NMR (C$_6$D$_6$) δ(ppm): 10.6 (Zr—CH$_3$); 10.9 (2,6-Me-Pn*); 12.4 (3,5-Me-Pn*); 13.4 (1,7-Me-Pn*); 14.0 (Me-Cp); 102.2 (1,7-Pn*); 105.5 (3,4-Cp); 106.4 (3,5-Pn*); 111.4 (2,5-Cp); 116.9 (8-Pn*); 119.8 (1-Cp); 123.1 (2,6-Pn*); 123.4 (4-Pn*).

Example 1f—Synthesis of Pn*ZrCp(Me)

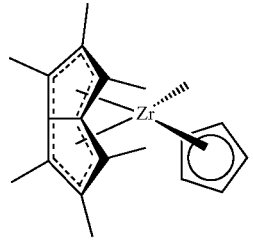

A solution of Pn*ZrCpCl (250 mg, 0.661 mmol) in toluene (15 mL) at −78° C. was added to a solution of MeLi (1.6 M in Et$_2$O, 415 μL, 0.664 mmol) in toluene at −78° C. The reaction mixture was stirred for 1 h before being exposed to dynamic vacuum while still in the cold bath. The solution was removed from the cold bath so that the removal of the solvent kept the temperature below 0° C. The solid was extracted with hexane (4×5 mL) and the combined extracts concentrated to 15 mL and cooled to −80° C. in a freezer overnight, yielding a yellow microcrystalline solid. The supernatant was removed and the solid dried in vacuo for 4 h to yield Pn*ZrCp(Me) in 68% yield (160 mg, 0.447 mmol).

Single crystals suitable for an X-ray diffraction study were grown from slow-evaporation of a benzene solution.

$^1$H NMR (400 MHz, C$_6$D$_6$) δ(ppm): −0.72 (s, 1H, Zr-Me); 1.64 (s, 6H, 2,6-Me-Pn*); 1.96 (s, 6H, 3,5-Me-Pn*); 1.97 (s, 6H, 1,7-Me-Pn*); 5.46 (s, 5H, Cp);

$^{13}$C{$^1$H} NMR (C$_6$D$_6$) δ(ppm): 10.0 (Zr—CH$_3$); 11.2 (2,6-Me-Pn*); 12.3, 13.4 (3,5-Me-Pn* & 1,7-Me-Pn*-indistinguishable by HSQC); 102.5 (1,7-Pn*); 106.4 (3,5-Pn*); 108.9 (Cp); 116.9 (8-Pn*); 123.3 (2,6-Pn*); 123.6 (4-Pn*).

Example 1g—Synthesis of Pn*ZrCp(H)

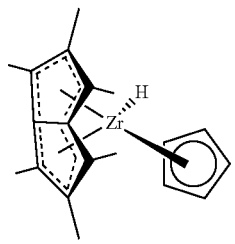

An ampoule was charged with a solution of Pn*ZrCpCl (150 mg, 0.397 mmol) in toluene (15 mL) and potassium triethylborohydride (1.0 M solution in THF, 417 µL, 0.417 mmol) and stirred for 48 h. The volatiles were removed in vacuo, the solid extracted with pentane (4×5 mL) and the combined extracts concentrated to 15 mL before being cooled to −80° C. in a freezer overnight. The supernatant was removed and the solid dried under vacuum for 4 h to yield Pn*ZrCp(H) in 42% yield (57 mg, 0.166 mmol).

Single crystals suitable for an X-ray diffraction study were grown from slow-evaporation of a benzene solution.

$^1$H NMR (400 MHz, C$_6$D$_6$) δ(ppm): 0.69 (d, 1H, J=1.6 Hz, Zr—H); 1.69 (s, 6H, 2,6-Me-Pn*); 2.05 (s, 6H, 3,5-Me-Pn*); 2.59 (s, 6H, 1,7-Me-Pn*); 5.54 (s, 5H, Cp);

$^{13}${$^1$H} NMR (C$_6$D$_6$) δ(ppm): 10.8 (2,6-Me-Pn*); 12.8 (3,5-Me-Pn*); 14.4 (1,7-Me-Pn*); 103.9 (3,5-Pn*); 105.5 (Cp); 108.6 (1,7-Pn*); 117.5 (4-Pn*); 121.4 (8-Pn*); 121.4 (2,6-Pn*).

Example 1h—Synthesis of Pn*ZrCp($^n$Bu)

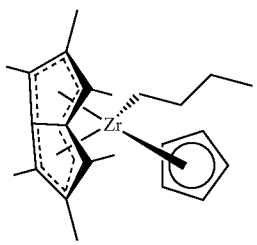

A solution of Pn*ZrCpCl (200 mg, 0.529 mmol) in toluene (15 mL) at −78° C. was added to a solution of $^n$BuLi (1.6 M in Et$_2$O, 347 µL, 0.555 mmol) in toluene at −78° C. The reaction mixture was stirred for 1 h, allowed to slowly warm to room temperature and stirred for a further hour. The volatiles were then removed under dynamic vacuum and the solid extracted with pentane (4×5 mL) and the combined extracts concentrated to 15 mL and cooled to −80° C. in a freezer overnight, yielding a yellow microcrystalline solid. The supernatant was removed and the solid dried in vacuo for 4 h to yield Pn*ZrCp($^n$Bu) in 57% yield (120 mg, 0.300 mmol).

$^1$H NMR (400 MHz, C$_6$D$_6$) δ(ppm): −0.14 (m, 2H, Zr—CH$_2$—); 1.16 (t, 3H, $^3J_{H-H}$=7.3 Hz, Zr—(CH$_2$)$_3$—CH$_3$); 1.42 (m, 2H, Zr—CH$_2$—CH$_2$—); 1.58 (m, 2H, Zr—(CH$_2$)$_2$—CH$_2$—); 1.63 (s, 6H, 2,6-Me-Pn*); 1.96 (s, 6H, 3,5-Me-Pn*); 1.99 (s, 6H, 1,7-Me-Pn*); 5.50 (s, 5H, Cp);

$^{13}$C{$^1$H} NMR (C$_6$D$_6$) δ(ppm): 11.0 (2,6-Me-Pn*); 12.1 (3,5-Me-Pn*); 13.6 (1,7-Me-Pn*); 14.6 (Zr—(CH$_2$)$_3$—CH$_3$); 28.9 (Zr—CH$_2$—); 32.4 (Zr—(CH$_2$)$_2$—CH$_2$—); 36.7 (Zr—CH$_2$—CH$_2$—); 102.4 (3,5-Pn*); 106.4 (1,7-Pn*); 108.5 (Cp); 116.7 (4-Pn*); 123.1 (8-Pn*); 123.5 (2,6-Pn*).

Example 1i—Synthesis of Pn*ZrCp(NMe$_2$)

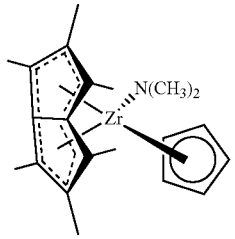

An ampoule was charged with Pn*ZrCpCl (100 mg, 0.27 mmol), LiNMe$_2$ (19 mg, 0.37 mmol) and benzene (20 mL) at room temperature. The resultant yellow solution was stirred for 3 days, filtered and the supernatant frozen at −78° C. and lyophilized under dynamic vacuum. Pn*ZrCp(NMe$_2$) was isolated as a yellow powder in 83% yield (85 mg, 0.22 mmol).

$^1$H NMR (400 MHz, C$_6$D$_6$) δ(ppm): 1.82 (s, 6H, 2,6-Me-Pn*); 1.89 (s, 6H, 3,5-Me-Pn*); 2.09 (s, 6H, 1,7-Me-Pn*); 2.40 (s, 6H, N-Me$_2$); 5.72 (s, 5H, Cp)

$^{13}$C{$^1$H} NMR (C$_6$D$_6$) δ(ppm): 11.3 (2,6-Me-Pn*); 12.2 (1,7-Me-Pn*); 13.8 (3,5-Me-Pn*); 48.2 (N-Me$_2$); 104.2 (3,5-Pn*); 108.0 (Cp); 112.5 (1,7-Pn*); 120.3 (4-Pn*); 125.1 (2,6-Pn*); 126.7 (8-Pn*).

Example 1j—Synthesis of Pn*ZrCp(NPh$_2$)

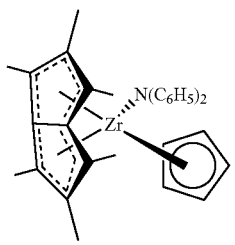

THF (20 mL) was cooled to −78° C. and added to Pn*ZrCpCl (100 mg, 0.27 mmol) and KNPh$_2$·THF$_{0.27}$ (70 mg, 0.31 mmol). The solution was allowed to warm to room temperature, stirred for 16 h then filtered and dried under dynamic vacuum. The yellow solid was redissolved in a pentane (20 mL) and toluene (10 mL) mixture, then filtered. The filtrate was reduced to a minimum volume and placed in a freezer at −80° C. for 3 days. The resultant yellow crystalline solid was isolated by filtration and dried in vacuo to give Pn*ZrCp(NPh$_2$) in 60% yield (81 mg, 0.16 mmol).

$^1$H NMR (400 MHz, THF d$^8$) δ(ppm): 1.58 (s, 6H, 3,5-Me-Pn*); 2.12 (s, 6H, 2,6-Me-Pn*); 2.20 (s, 6H, 1,7-Me-Pn*); 5.62 (s, 5H, Cp); 6.58 (m, 6H, N-Ph$_{meta}$ & N-Ph$_{para}$); 7.00 (m, 4H, N-Ph$_{ortho}$).

$^{13}$C{$^1$H} NMR (THF d$^8$) δ(ppm): 11.0 (3,5-Me-Pn*); 11.5 (2,6-Me-Pn*); 13.6 (1,7-Me-Pn*); 106.3 (1,7-Pn*); 111.2 (Cp); 112.0 (3,5-Pn*); 117.7 (N-Ph meta/para); 118.3 (8-Pn*); 118.3 (2,6-Pn*); 124.1 (N-Ph meta/para) 128.3 (4-Pn*); 128.5 (N-Ph ortho); 159.1 (N-Ph ipso).

Example 1k—Synthesis of ZrPn*FluCl

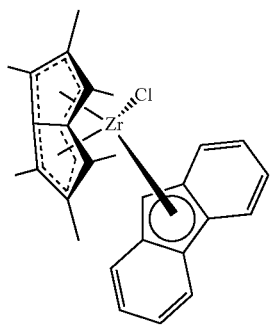

[ZrPn*(μ—Cl)$_{3/2}$]$_2$(μ-Cl)$_2$Li.THF$_{(1.02)}$ (51 mg, 0.060 mmol) and LiFlu (21 mg, 0.12 mol) were introduced into an NMR tube and dissolved in 0.5 mL of C$_6$D$_6$ and the solution turned bright yellow instantly. The reaction mixture was heated to 80° C. for 96 h and the benzene was filtered through celite. The benzene was removed to afford Pn*ZrFluCl as a pale green solid. Yield: 26 mg (80% yield).

$^1$H NMR (benzene-d$_6$, 400 MHz): δ 1.25 1.76 2.07 (s, 6H, Pn-CH$_3$), 4.69 (s, 1H, Flu-H), 7.04 (m, 2H, Flu-H), 7.08 (m, 2H, Flu-H), 7.17 (d, 2H, Flu-H, $^3J_{HH}$=7.72 Hz), 8.31 (d, 2H, Flu-H, $^3J_{HH}$=8.29 Hz).

$^{13}$C{$^1$H} NMR (benzene-d$_6$, 100 MHz): δ 9.5 12.5 12.8 (Pn-CH$_3$), 75.5 (Flu(C)), 118.5 (Flu(C)), 121.9 (Flu(C)), 126.5 (Flu(C)), 127.0 (Flu(C)).

Example 1l—Synthesis of Pn*ZrCp$^{Me}$(OAm)

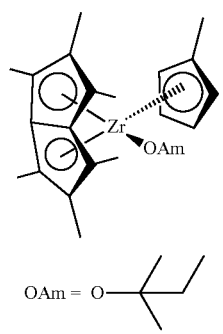

Pn*ZrCp$^{Me}$Cl (0.020 g, 0.051 mmol) and KO-2,6-$^i$Pr—C$_6$H$_3$ (0.006 g, 0.051 mmol) were combined in C$_6$D$_6$ (0.5 mL) and sonicated for 2×30 minutes to afford a yellow solution and colourless precipitate. Analysis of the solution using 1H NMR spectroscopy indicated the formation of Pn*ZrCp$^{Me}$(OAm).

$^1$H NMR (benzene-d$_6$, 23° C.): δ 5.70 5.55 (app.t, 2H each, J$_{H-H}$=2.7 Hz, C$_5$H$_4$Me), 2.07 (s, 6H, CH$_3$-Pn*), 2.02 (s, 3H, C$_5$H$_4$Me), 1.95 1.89 (s, 6H each, CH$_3$-Pn*), 1.48 (q, 2H, $^3J_{HH}$=7.4 Hz, C(CH$_3$)$_2$CH$_2$CH$_3$), 1.13 (s, 6H, C(CH$_3$)$_2$CH$_2$CH$_3$), 0.86 (t, 2H, $^3J_{HH}$=7.4 Hz, C(CH$_3$)$_2$CH$_2$CH$_3$).

Example 1m—Synthesis of Pn*ZrCp$^{Me}$(O-2,6-Me-C$_6$H$_3$)

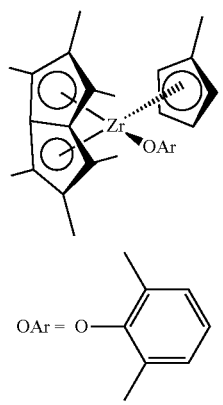

Pn*ZrCp$^{Me}$Cl (0.018 g, 0.046 mmol) and KO-2,6-Me-C$_6$H$_3$ (0.0090 g, 0.046 mmol) were combined in C$_6$D$_6$ (0.5 mL) and sonicated for 2×30 minutes to afford a yellow solution and colourless precipitate. After was followed by drying of the filtrate in vacuo to afford Pn*ZrCp$^{Me}$(O-2,6-Me-C$_6$H$_3$) as a pale yellow solid. Single crystals suitable for an X-ray diffraction study were grown from a pentane solution at −30° C.

$^1$H NMR (benzene-d$_6$, 23° C.): δ 7.17 (d, 2H, $^3J_{HH}$=7.4 Hz, 3,5-C$_6$H$_3$), 6.82 (t, 1H, $^3J_{HH}$=7.4 Hz, 4-C$_6$H$_5$), 5.47 5.20 (app.t, 2H each, J$_{HH}$=2.7 Hz, C$_5$H$_4$Me), 2.08 1.92 1.88 1.84 (s, 6H each, CH$_3$-Pn* or 2,6-Me-C$_6$H$_3$), 1.83 (s, 3H, C$_5$H$_4$Me).

Example 1n—Synthesis of Pn*ZrCp$_{Me}$(O-2,6-$^i$Pr—C$_6$H$_3$)

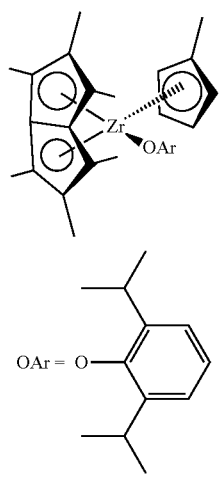

Pn*ZrCp$_{Me}$Cl (0.020 g, 0.051 mmol) and KO-2,6-$^i$Pr—C$_6$H$_3$ (0.011 g, 0.051 mmol) were combined in C$_6$D$_6$ (0.5 mL) and sonicated for 2×30 minutes to afford a yellow solution and colourless precipitate. After was followed by drying of the filtrate in vacuo to afford Pn*ZrCp$^{Me}$(O-2,6-$^i$Pr—C$_6$H$_3$) as a pale yellow solid.

$^1$H NMR (benzene-d$_6$, 23° C.): δ 7.17 (d, 2H, $^3J_{HH}$=7.5 Hz, 3,5-C$_6$H$_3$), 6.96 (t, 1H, $^3J_{HH}$=7.5 Hz, 4-C$_6$H$_5$), 5.63 5.22

(app.t, 2H each, $J_{HH}$=2.7 Hz, $C_5H_4Me$), 2.93 (sept., 2H, $^3J_{HH}$=6.8 Hz, $CH(CH_3)_2$), 2.01 1.90 (s, 6H each, $CH_3$-Pn*), 1.89 (s, 3H, $C_5H_4Me$), 1.87 (s, 6H, $CH_3$-Pn*), 1.35 1.21 (d, 2H each, $^3J_{HH}$=6.8 Hz, $CH(CH_3)_2$).

Example 1o—Synthesis of Pn*ZrCp$^{Me}$(O-2,4-$^t$Bu-$C_6H_3$)

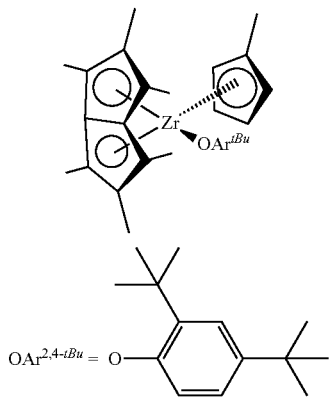

Pn*ZrCp$^{Me}$Cl (0.032 g, 0.082 mmol) and KO-2,4-$^t$Bu-$C_6H_3$ (0.020 g, 0.082 mmol) were combined in $C_6D_6$ (0.5 mL) and sonicated for 2×30 minutes to afford a yellow solution and colourless precipitate. After was followed by drying of the filtrate in vacuo to afford Pn*ZrCp$^{Me}$(O-2,6-$^t$Bu-$C_6H_3$) as a pale yellow solid.

$^1$H NMR (benzene-d$_6$, 23° C.): δ 7.57 7.26 (m, 1H each, 3,5,6-$C_6H_3$), 5.99 5.66 5.58 5.30 (m, 1H each, $C_5H_4Me$), 2.19 1.99 1.93 1.92 1.90 1.90 1.85 (s, 3H each, $CH_3$-Pn* or $C_5H_4Me$), 1.60 1.43 (s, 9H each, O-2,4-$^t$Bu-$C_6H_3$).

Example 1p—Synthesis of Pn*ZrCp$^{Me}$(NMe$_2$)

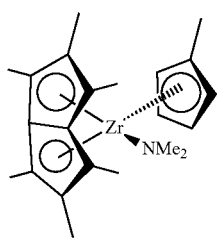

Pn*ZrCp$^{Me}$Cl (0.045 g, 0.11 mmol) and LiNMe$_2$ (0.0058 g, 0.11 mmol) were combined in $C_6D_6$ (0.5 mL) and sonicated 30 minutes to afford a yellow solution and colourless precipitate. After was followed by drying of the filtrate in vacuo to afford Pn*ZrCp$^{Me}$(NMe$_2$) as a pale yellow solid.

$^1$H NMR (benzene-d$_6$, 23° C.): δ 5.66 5.50 (m, 2H each, $C_5H_4Me$), 2.43 2.11 1.92 (s, 6H each, $CH_3$-Pn* or NMe$_2$), 1.92 (s, 3H, $C_5H_4Me$) 1.82 (s, 6H each, $CH_3$-Pn* or NMe$_2$).

COMPARATIVE EXAMPLE—SYNTHESIS OF Pn*ZrCp$^{tBu}$Cl

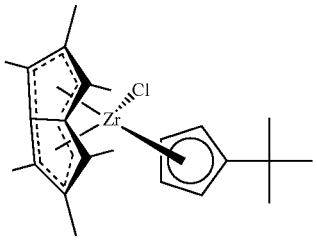

To [Pn*Zr(μ-Cl)$_{3/2}$]$_2$(μ-Cl)$_2$Li.Et$_2$O$_{(1.21)}$ (300 mg, 0.362 mmol) in Et$_2$O (20 mL) at −78° C. was added a slurry of LiCp$^{tBu}$ in Et$_2$O (15 mL) at −78° C. The reaction mixture was warmed to room temperature over the course of 1 h, and then stirred for 1 h. The volatiles were removed under vacuum, and the solids extracted into benzene (3×2 mL) and lyophilized. The solid was washed with −78° C. pentane (2×3 mL) and dried under vacuum for 4 h to afford Pn*ZrCp$^{tBu}$Cl in 80% yield (253 mg, 0.583 mmol). Analytical samples were prepared by recrystallizing the product from pentane at −78° C.

Single crystals suitable for an X-ray diffraction study were grown from slow-evaporation of a benzene solution. Anal Calcd (found) for $C_{23}H_{31}ClZr$: C, 63.63 (63.55); H, 7.20 (7.33).

$^1$H NMR (400 MHz, $C_6D_6$) δ(ppm): 1.33 (s, 9H, $^t$Bu-Cp); 1.71 (s, 6H, 2,6-Me-Pn*); 1.83 (s, 6H, 3,5-Me-Pn*); 2.09 (s, 6H, 1,7-Me-Pn*); 5.04 (t, 2H, $^3J_{H-H}$=2.8 Hz, 2,5-H-Cp); 5.96 (t, 2H, $^3J_{H-H}$=2.8 Hz, 3,4-H-Cp).

$^{13}$C{$^1$H} NMR (100 MHz, $C_6D_6$) δ(ppm): 11.6 (2,6-Me-Pn*); 12.6 (1,7-Me-Pn*); 13.3 (3,5-Me-Pn*); 32.2 (CMe$_3$-Cp); 104.2 (2,5-Cp); 105.0 (3,5-Pn*); 112.3 (1,7-Pn*); 113.9 (3,4-Cp); 119.4 (4-Pn*); 126.1 (2,6-Pn*); 128.6 (8-Pn*); 138.8 (1-Cp).

EXAMPLE 2—SYNTHESIS OF CATALYTIC COMPOSITIONS

Example 2a—Supporting Pre-Catalyst on Solid Polymethylaluminoxane

The compounds of Examples 1 a-c were supported on solid MAO according to the following general method:

Toluene (40 ml) was added to a Schlenk tube containing solid aluminoxane (300 mg, 5.172 mmol) (solid MAO) (produced by TOSOH, Lot no. TY130408) and Pn*ZrCp$^{Me}$Cl (10.1 mg, 0.0258 mmol) (shown above) at room temperature. The slurry was heated to 80° C. and left, with occasional swirling, for two hours during which time the solution turned colourless and the solid colourised. The resulting suspension was then left to cool down to room temperature and the toluene solvent was carefully filtered and removed in vacuo to obtain solid MAO/Pn*ZrCp$^{Me}$Cl catalyst as a free-flowing powder in 88% yield (273 mg).

Example 2b—Alternative Approach for Supporting Pre-Catalyst on Solid Polymethylaluminoxane The compounds of Examples 1a-j were supported on solid polymethylaluminoxane according to the following general method:

The polymethylaluminoxane was combined with the pre-catalyst and stirred together dry for 5 minutes. The stirring was halted and toluene (10 mL) was added to the mixture and heated to 60° C. for 1 h. The contents were manually swirled every 5 minutes and after 1 h were allowed to settle leaving a colored solid and a colorless solution. The supernatant was removed via cannula and the solid dried under vacuum for 4 h.

The resulting supported pre-catalysts were characterised as follows:

Pn*ZrCpCl-sMAO $^{13}$C CPMAS (10 KHz) δ (ppm): −13.3 (sMAO-Me); 6.3 (Pn*-Me); 106.2 (Cp-ring; Pn*-ring); 123.0 (sMAO-benzoate); 126.4 (sMAO-benzoate); 172.0 (sMAO-benzoate α-C(O)O). $^{27}$Al DPMAS (15 KHz) δ (ppm): −387.4; −250.7; −83.1; 75.7; 211.2; 347.0.

Pn*ZrCp$^{Me}$Cl-sMAO $^{13}$C CPMAS (10 KHz) δ (ppm): −13.3 (sMAO-Me); 6.7 (Pn*-Me); 15.1 (Cp-Me); 106.7 (Cp-ring; Pn*-ring); 122.9 (sMAO-benzoate); 126.0 (sMAO-benzoate); 130.8 (sMAO-benzoate); 172.4 (sMAO-benzoate α-C(O)O). $^{27}$Al HAHNECHO (15 KHz) δ (ppm): −242.4; −86.4; 97.6; 179.2; 330.3.

Pn*ZrCp$^{tBu}$Cl-sMAO $^{13}$C CPMAS (10 KHz) δ (ppm): −13.3 (sMAO-Me); 6.7 (Pn*-Me); 26.9 (Cp-C-Me$_3$); 111.2 (Cp-ring; Pn*-ring); 123.0 (sMAO-benzoate); 126.0 (sMAO-benzoate); 130.7 (sMAO-benzoate); 171.9 (sMAO-benzoate α-C(O)O). $^{27}$Al DPMAS (15 KHz) δ (ppm): −246.8; −80.5; 74.2; 204.4; 351.0.

Pn*ZrCp$^{nBu}$Cl-sMAO $^{13}$C CPMAS (10 KHz) δ (ppm): —13.3 (sMAO-Me); 6.5 (Pn*-Me); 15.9 (Cp-nButyl); 23.0 (Cp-nButyl); 28.4 (Cp-nButyl); 108.6 (Cp-ring; Pn*-ring); 123.1 (sMAO-benzoate); 126.2 (sMAO-benzoate); 131.2 (sMAO-benzoate); 172.5 (sMAO-benzoate α-C(O)O). $^{27}$Al HAHNECHO (15 KHz) δ (ppm): −241.1; −84.2; 72.4; 204.3; 343.2.

Pn*ZrCp$^{Me3}$Cl-sMAO $^{13}$C CPMAS (10 KHz) δ (ppm):−13.4 (sMAO-Me); 6.2 (Pn*-Me); 107.2 (Cp-ring; Pn*-ring); 123.0 (sMAO-benzoate); 126.0 (sMAO-benzoate); 130.7 (sMAO-benzoate); 172.0 (sMAO-benzoate α-C(O)O). $^{27}$Al DPMAS (15 KHz) δ (ppm): −385.1; −247.7; −78.1; 32.7; 203.7; 349.0.

Pn*ZrIndCl-sMAO $^{13}$C CPMAS (10 KHz) δ (ppm): −13.3 (sMAO-Me); 6.3 (Pn*-Me); 122.9 (sMAO-benzoate); 130.8 (sMAO-benzoate); 172.8 (sMAO-benzoate α-C(O)O). $^{27}$Al DPMAS (15 KHz) δ (ppm): −382.5; 247.1; −75.2; 33.2; 209.4; 353.0.

Pn*ZrCp$^{Me}$Me-sMAO $^{13}$C CPMAS (10 KHz) δ (ppm): −13.3 (sMAO-Me); 6.2 (Pn*-Me); 106.4 (Cp-ring; Pn*-ring); 122.8 (sMAO-benzoate); 126.0 (sMAO-benzoate); 130.0 (sMAO-benzoate); 171.7 (sMAO-benzoate α-C(O)O). $^{27}$Al HAHNECHO (15 KHz) δ (ppm): −240.0; −81.1; 83.0; 208.6; 345.9.

EXAMPLE 3—POLYMERISATION STUDIES

Example 3a—General Procedure for Slurry-Phase Polymerization of Ethylene

An ampoule is charged with TiBA (150 mg, 0.756 mmol), toluene (50 mL) and the supported catalyst (10 mg). The contents are placed in an oil bath at the required temperature and allowed to equilibrate for 5 minutes while the headspace is degassed. The flask is opened to ethylene (2 bar) and stirred at 1200 rpm for the duration of the experiment. The polymer is then filtered, washed with pentane (2×20 mL) and dried at 5 mbar overnight.

Example 3b—Ethylene Polymerisation Activity (Solid MAO Supported Slurry Phase)

Figure 1A:
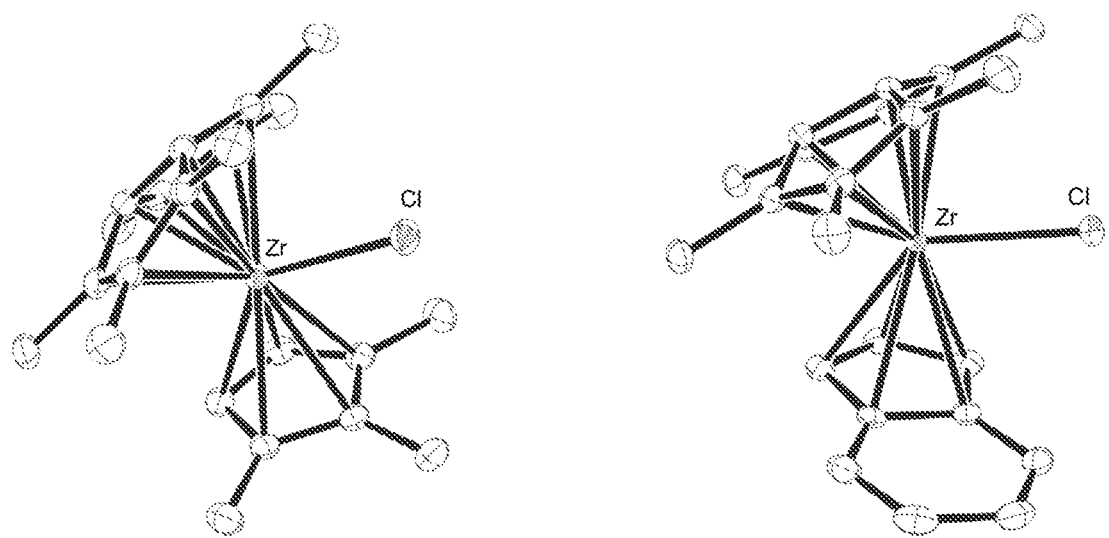
Figure 1B:
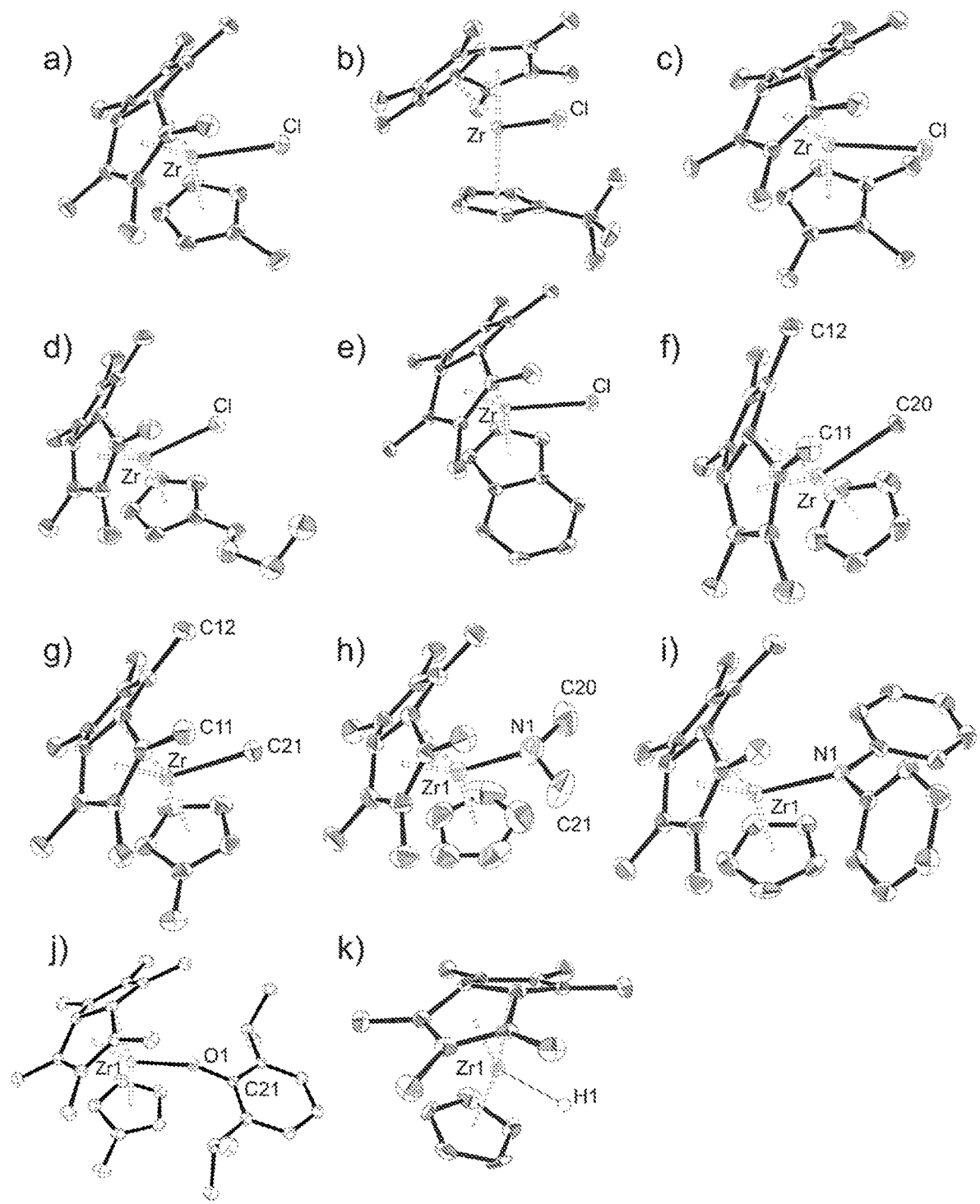
Figure 2:
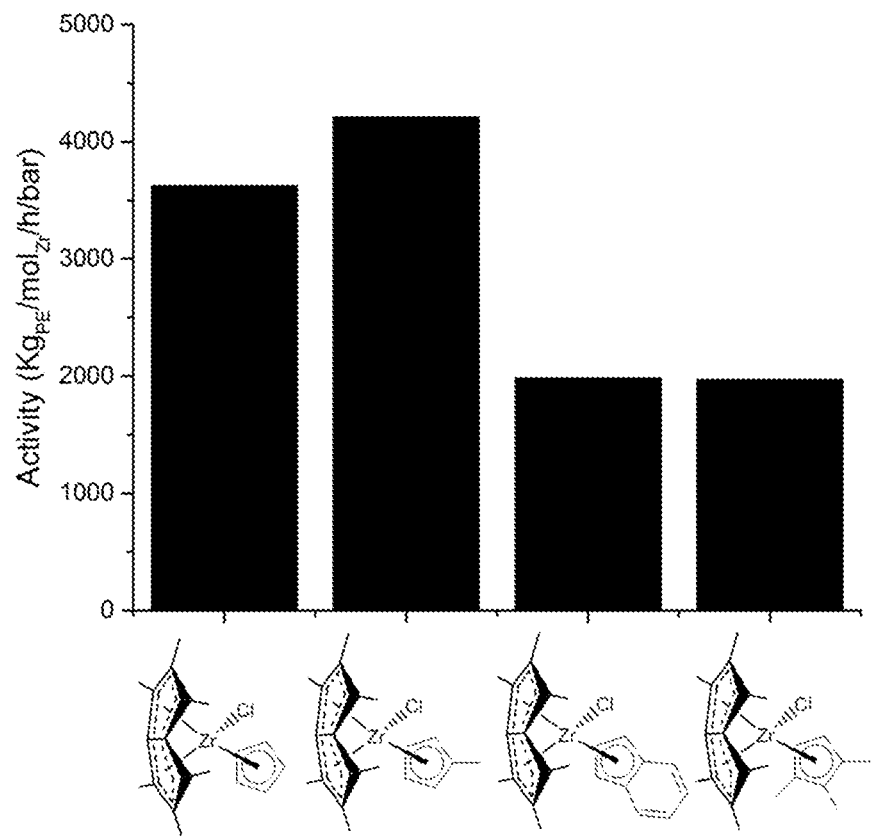
FIG. 2 shows the activity of various solid MAO-supported Pn*ZrCp$^R$Cl complexes in the slurry phase polymerisation of ethylene. Polymerisation conditions [Zr]:[TIBA] of 1:200, 50 mL toluene, 60° C., 2 bar and 30 minutes.

Four zirconium complexes were reacted with Solid MAO and used in the Solid MAO supported slurry polymerisation of ethylene in the conditions [M]:[TIBA] of 1:200, 50 mL toluene, 60° C. and 30 minutes. The results are shown in FIG. 2 and Table 1.

TABLE 1

Summary of the Solid MAO slurry polymerisation of various Pn*ZrCp$^R$Cl complexes

| Complex | T (° C.) | Time (minutes) | Activity Kg$_{PE}$/mol$_{Zr}$/h/bar |
|---|---|---|---|
| Pn*ZrCpCl | 50 | 30 | 2833 ± 82 |
| Pn*ZrCpCl | 70 | 30 | 3055 ± 7 |
| Pn*ZrCpCl | 60 | 30 | 3630 ± 257 |
| Pn*ZrCpCl | 60 | 60 | 2648 ± 41 |
| Pn*ZrCpCl | 60 | 15 | 3837 ± 156 |
| Pn*ZrCpCl | 60 | 5 | 4295 ± 186 |
| Pn*ZrCp$^{Me}$Cl | 60 | 30 | 4288 ± 184 |
| Pn*ZrCp$^{1,2,3-Me}$Cl | 60 | 30 | 1984 ± 507 |
| Pn*ZrIndCl | 60 | 30 | 1971 ± 76 |

Example 3c—Ethylene Polymerisation Activity (Solid MAO Supported Slurry Phase)

Figure 3:
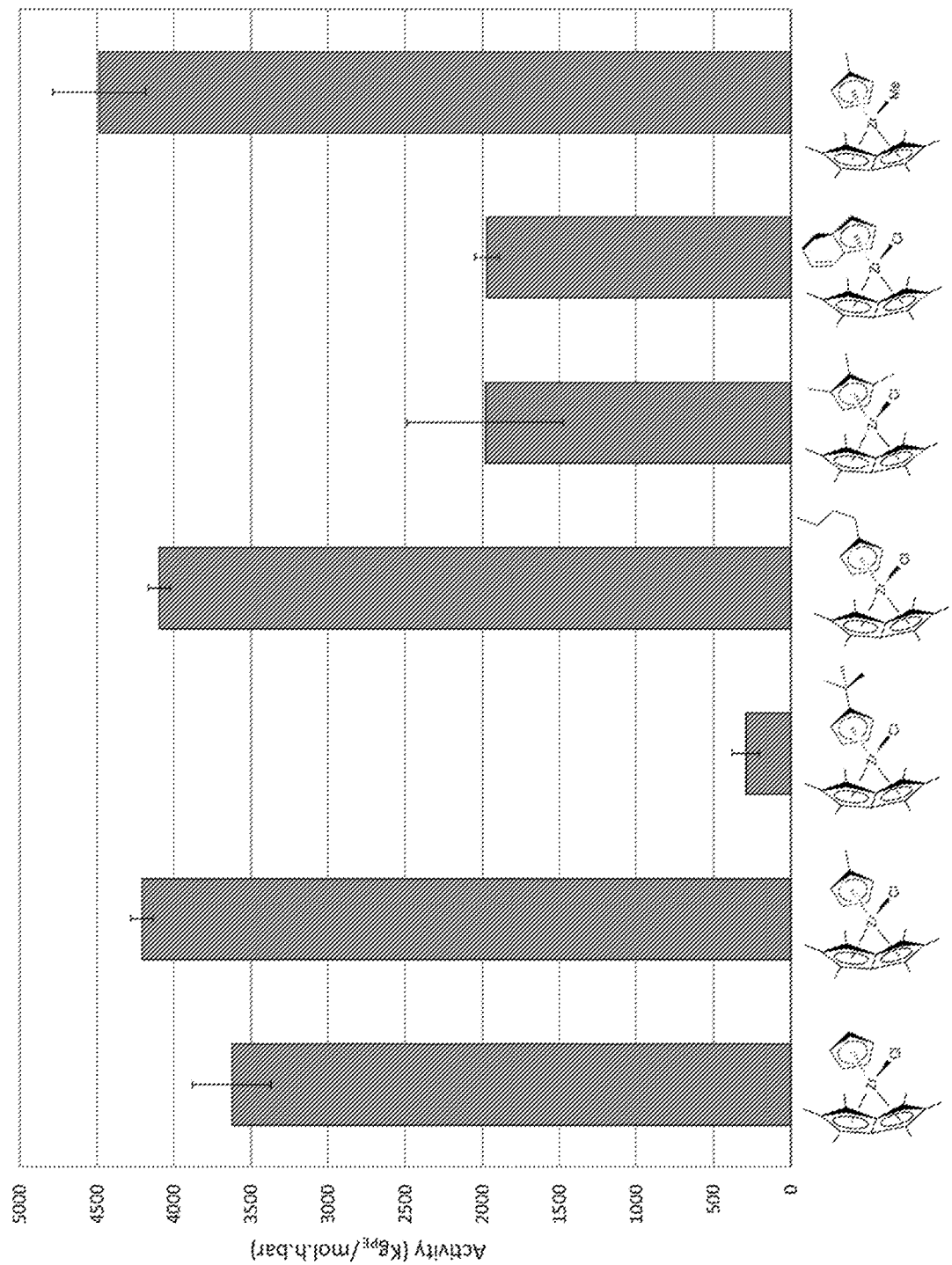
FIG. 3 shows ethylene polymerisation activities of pre-catalysts supported on polymethylaluminoxane (solid MAO) of Pn*ZrCp$^R$Cl (Cp$^R$=Cp, Cp$^{Me}$, Cp$^{tBu}$, Cp$^{nBu}$, Cp$^{Me3}$, Ind) and Pn*ZrCp$^{Me}$Me. Polymerisation conditions: [Zr]:[sMAO]=1:200; 150 mg TiBA co-catalyst; 2 bar ethylene; 10 mg catalyst loading; 50 mL toluene; 60° C.; 30 minutes.

Following the procedure outlined in Example 3a, the catalytic activity of various solid MAO-supported pre-catalysts in the polymerisation of ethylene was assessed. The results are outlined in Table 2 and FIG. 3.

TABLE 2

Summary of the solid MAO slurry polymerisation using various Pn*ZrCp$^R$Cl (Cp$^R$ = Cp, Cp$^{Me}$, Cp$^{tBu}$, Cp$^{nBu}$, Cp$^{Me}_3$, Ind) and Pn*ZrCp$^{Me}$Me. Polymerisation conditions: [Zr]:[sMAO] = 1:200; 150 mg TiBA co-catalyst; 2 bar ethylene; 10 mg catalyst loading; 50 mL toluene; 60° C.; 30 minutes.

| Complex | Temperature (° C.) | Time (minutes) | Activity (kg$_{PE}$/(mol$_{Zr}$ · h · bar)) |
|---|---|---|---|
| Pn*ZrCpCl | 60 | 30 | 3624 ± 256 |
| Pn*ZrCp$^{Me}$Cl | 60 | 30 | 4209 ± 73 |
| Pn*ZrCp$^{tBu}$Cl | 60 | 30 | 294 ± 86 |
| Pn*ZrCp$^{nBu}$Cl | 60 | 30 | 4096 ± 72 |
| Pn*ZrCp$^{Me3}$Cl | 60 | 30 | 1981 ± 507 |
| Pn*ZrIndCl | 60 | 30 | 1971 ± 77 |
| Pn*ZrCp$^{Me}$(Me) | 60 | 30 | 4486 ± 300 |

Table 2 shows that significant rate enhancements can be observed with variation of Cp$^R$.

Example 3d—Polyethylene Characteristics

The molecular weight (M$_w$, and M$_n$) and polydispersity index (PDI) of polyethylenes prepared using various solid MAO-supported pre-catalysts were determined. The results are outlined in Table 3 and FIG. 4.

TABLE 3

Polymer molecular weight, $M_w$, for polymethylaluminoxane supported ethylene polymerization at 60° C. with Pn*ZrCp$^R$Cl ($Cp^R$ = Cp, Cp$^{Me}$, Cp$^{tBu}$, Cp$^{Me3}$, Ind). PDIs are given in parentheses. Polymerisation conditions [Zr]:[sMAO] = 1:200; 150 mg TiBA co-catalyst; 2 bar ethylene; 10 mg catalyst loading; 50 mL toluene; 60° C.; 30 minutes.

| Complex | Temperature (° C.) | Time (minutes) | $M_w$ (Kg/mol) | $M_n$ (Kg/mol) | PDI |
|---|---|---|---|---|---|
| Pn*ZrCpCl | 60 | 30 | 325000 | 137000 | 2.4 |
| Pn*ZrCp$^{Me}$Cl | 60 | 30 | 250000 | 103000 | 2.4 |
| Pn*ZrCp$^{tBu}$Cl | 60 | 30 | 310000 | 44000 | 7 |
| Pn*ZrCp$^{Me3}$Cl | 60 | 30 | 505000 | 133000 | 3.8 |
| Pn*ZrIndCl | 60 | 30 | 290000 | 86000 | 3.4 |

The molecular weight distribution of polyethylene prepared using solid-MAO supported Pn*ZrCp$^{tBu}$Cl was determined by GPC. The results are illustrated in FIG. 5.

Table 3 shows that molecular weight can be controlled by variation of $Cp^R$.

Example 3e—Effect of Temperature on Catalytic Activity of Solid-MAO Supported Pn*ZrCp$^{Me}$Cl The temperature dependence of ethylene polymerisation activity with solid MAO-supported Pn*ZrCp$^{Me}$Cl was assessed. The results are outlined in Table 4 and FIG. 6.

TABLE 4

Temperature dependence of ethylene polymerization activity with solid MAO-supported Pn*ZrCp$^{Me}$Cl. Polymerisation conditions [Zr]:[sMAO] = 1:200; 150 mg TiBA co-catalyst; 2 bar ethylene; 10 mg catalyst loading; 50 mL toluene; 30 minutes.

| Complex | Temperature (° C.) | Time (minutes) | Activity ($kg_{PE}/(mol_{Zr} \cdot h \cdot bar)$) |
|---|---|---|---|
| Pn*ZrCp$^{Me}$Cl | 40 | 30 | 2563 ± 103 |
| Pn*ZrCp$^{Me}$Cl | 50 | 30 | 2988 ± 34 |
| Pn*ZrCp$^{Me}$Cl | 60 | 30 | 4209 ± 73 |
| Pn*ZrCp$^{Me}$Cl | 70 | 30 | 3368 ± 164 |
| Pn*ZrCp$^{Me}$Cl | 80 | 30 | 2841 ± 62 |

Table 4 shows that the maximum activity for Pn*ZrCp$^{Me}$Cl was observed at 60° C.

Example 3f—Effect of Temperature on Catalytic Activity of Solid-MAO Supported Pn*ZrCp$^{nBu}$Cl The temperature dependence of ethylene polymerisation activity with solid MAO-supported Pn*ZrCp$^{nBu}$Cl was assessed. The results are outlined in Table 5 and FIG. 7.

TABLE 5

Temperature dependence of ethylene polymerization activity with solid MAO-supported Pn*ZrCp$^{nBu}$Cl. Polymerisation conditions [Zr]:[sMAO] = 1:200; 150 mg TiBA co-catalyst; 2 bar ethylene; 10 mg catalyst loading; 50 mL toluene; 30 minutes.

| Complex | Temperature (° C.) | Time (minutes) | Activity ($kg_{PE}/(mol_{Zr} \cdot h \cdot bar)$) |
|---|---|---|---|
| Pn*ZrCp$^{nBu}$Cl | 40 | 30 | 4786 ± 156 |
| Pn*ZrCp$^{nBu}$Cl | 50 | 30 | 5025 ± 213 |
| Pn*ZrCp$^{nBu}$Cl | 60 | 30 | 4096 ± 72 |
| Pn*ZrCp$^{nBu}$Cl | 70 | 30 | 3446 ± 195 |
| Pn*ZrCp$^{nBu}$Cl | 80 | 30 | 3502 ± 62 |

Table 5 shows that the maximum activity for Pn*ZrCp$^{nBu}$Cl was observed at 50° C.

Example 3g—Effect of Temperature on Catalytic Activity of Solid-MAO Supported Pn*ZrCp$^{Me}$(Me)

The temperature dependence of ethylene polymerisation activity with solid MAO-supported Pn*ZrCp$^{Me}$(Me) was assessed. The results are outlined in Table 6 and FIG. 8.

TABLE 6

Temperature dependence of ethylene polymerization activity with solid MAO-supported Pn*ZrCp$^{Me}$(Me). Polymerisation conditions [Zr]:[sMAO] = 1:200; 150 mg TiBA co-catalyst; 2 bar ethylene; 10 mg catalyst loading; 50 mL toluene; 30 minutes.

| Complex | Temperature (° C.) | Time (minutes) | Activity ($kg_{PE}/(mol_{Zr} \cdot h \cdot bar)$) |
|---|---|---|---|
| Pn*ZrCp$^{Me}$(Me) | 40 | 30 | 2644 ± 252 |
| Pn*ZrCp$^{Me}$(Me) | 50 | 30 | 5012 ± 50 |
| Pn*ZrCp$^{Me}$(Me) | 60 | 30 | 4376 ± 441 |
| Pn*ZrCp$^{Me}$(Me) | 70 | 30 | 3074 ± 66 |
| Pn*ZrCp$^{Me}$(Me) | 80 | 30 | 2968 ± 70 |

Table 6 shows that the maximum activity for Pn*ZrCp$^{Me}$(Me) was observed at 50° C.

Example 3h—Effect of Reaction Duration on Catalytic Activity of Solid-MAO Supported Pn*ZrCpCl and Characteristics of Resulting Polyethylene The time dependence of ethylene polymerization activity and polymer molecular weight ($M_w$) with solid MAO-supported Pn*ZrCpCl was assessed. The results are outlined in Table 7 and FIG. 9.

TABLE 7

Time dependence of ethylene polymerization activity and polymer molecular weight, $M_w$ with polymethylaluminoxane supported pre-catalyst, Pn*ZrCpCl. PDIs are also given. Polymerisation conditions [Zr]:[sMAO] = 1:200; 150 mg TiBA co-catalyst; 2 bar ethylene; 10 mg catalyst loading; 50 mL toluene; 60° C.

| Complex | Temperature (° C.) | Time (minutes) | Activity ($kg_{PE}/(mol_{Zr} \cdot h \cdot bar)$) | Mw (kg/mol) | Mn (kg/mol) | PDI |
|---|---|---|---|---|---|---|
| Pn*ZrCpCl | 60 | 5 | 4296 ± 187 | 415000 | 158000 | 2.6 |
| Pn*ZrCpCl | 60 | 15 | 3837 ± 156 | 320000 | 131000 | 2.4 |
| Pn*ZrCpCl | 60 | 30 | 3624 ± 256 | 325000 | 137000 | 2.4 |
| Pn*ZrCpCl | 60 | 60 | 2649 ± 42 | 295000 | 123000 | 2.4 |

Table 7 shows that the molecular weight of the polyethylene can be controlled by varying the duration of polymerisation, with concomitant effects observed for activity.

Example 3i—Effect of Temperature on Catalytic Activity of Solid-MAO Supported Pn*ZrCp$^{Me}$(Me) and Characteristics of Resulting Polyethylene The temperature dependence of ethylene polymerization activity and polymer molecular weight ($M_w$) with solid MAO-supported Pn*ZrCpCl was assessed. The results are outlined in Table 8 and FIG. 10.

TABLE 8

Temperature dependence of ethylene polymerization activity and polymer molecular weight, $M_w$ with polymethylaluminoxane supported pre-catalyst, Pn*ZrCpCl. PDIs are also given. Polymerisation conditions [Zr]:[sMAO] = 1:200; 150 mg TiBA co-catalyst; 2 bar ethylene; 10 mg catalyst loading; 50 mL toluene.

| Complex | Temperature (° C.) | Time (minutes) | Activity ($kg_{PE}/(mol_{Zr} \cdot h \cdot bar)$) | Mw (kg/mol) | Mn (kg/mol) | PDI |
|---|---|---|---|---|---|---|
| Pn*ZrCpCl | 50 | 30 | 2833 ± 82 | 385000 | 156000 | 2.5 |
| Pn*ZrCpCl | 60 | 30 | 3624 ± 257 | 325000 | 137000 | 2.4 |
| Pn*ZrCpCl | 70 | 30 | 3056 ± 6 | 230000 | 98000 | 2.4 |

Table 8 shows that the molecular weight of the polyethylene can be controlled by varying the duration of polymerisation, with concomitant effects observed for activity.

Example 3j—Effect of Temperature on Catalytic Activity of Solid-MAO Supported Pn*ZrCp(NMe$_2$)

The temperature dependence of ethylene polymerisation activity with solid MAO-supported Pn*ZrCp(NMe$_2$) was assessed. The results are outlined in Table 9 and FIG. 11.

TABLE 9

Temperature dependence of ethylene polymerization activity with solid MAO-supported Pn*ZrCp(NMe$_2$). Polymerisation conditions [Zr]:[sMAO] = 1:200; 150 mg TiBA co-catalyst; 2 bar ethylene; 10 mg catalyst loading; 50 mL toluene. 30 minutes.

| Complex | Temperature (° C.) | Time (minutes) | Activity ($kg_{PE}/(mol_{Zr} \cdot h \cdot bar)$) |
|---|---|---|---|
| Pn*ZrCp(NMe$_2$) | 40 | 30 | 2905 ± 83 |
| Pn*ZrCp(NMe$_2$) | 50 | 30 | 2426 ± 195 |
| Pn*ZrCp(NMe$_2$) | 60 | 30 | 2337 ± 86 |
| Pn*ZrCp(NMe$_2$) | 70 | 30 | 2197 ± 5 |
| Pn*ZrCp(NMe$_2$) | 80 | 30 | 1645 ± 27 |

Table 9 shows that in contrast to compositions where Y=Cl or methyl, when Y=NMe$_2$ the maximum activity was observed at 40° C.

Example 3k—Effect of Temperature on Catalytic Activity of Solid-MAO Supported Pn*ZrCp(NPh$_2$)

The temperature dependence of ethylene polymerisation activity with solid MAO-supported Pn*ZrCp(NPh$_2$) was assessed. The results are outlined in Table 10 and FIG. 12.

TABLE 10

Temperature dependence of ethylene polymerization activity with solid MAO-supported Pn*ZrCp(NPh$_2$). Polymerisation conditions [Zr]:[sMAO] = 1:200; 150 mg TiBA co-catalyst; 2 bar ethylene; 10 mg catalyst loading; 50 mL toluene; 30 minutes

| Complex | Temperature (° C.) | Time (minutes) | Activity ($kg^{PE}/(mol_{Zr} \cdot h \cdot bar)$) |
|---|---|---|---|
| Pn*ZrCp(NPh$_2$) | 40 | 30 | 2361 ± 291 |
| Pn*ZrCp(NPh$_2$) | 50 | 30 | 1945 ± 212 |
| Pn*ZrCp(NPh$_2$) | 60 | 30 | 1715 ± 366 |
| Pn*ZrCp(NPh$_2$) | 70 | 30 | 1332 ± 301 |
| Pn*ZrCp(NPh$_2$) | 80 | 30 | 1090 ± 384 |

Table 10 shows that in contrast to compositions where Y=Cl or methyl, when Y=NPh$_2$ the maximum activity was observed at 40° C.

Example 3l—Effect of Reaction Duration on Catalytic Activity of Solid-MAO Supported Pn*ZrCp(NMe$_2$)

The time dependence of ethylene polymerization activity with solid MAO-supported Pn*ZrCp(NMe$_2$) was assessed. The results are outlined in Table 11 and FIG. 13.

TABLE 11

Time dependence of ethylene polymerization activity with polymethylaluminoxane supported pre-catalyst, Pn*ZrCp(NMe$_2$). Polymerisation conditions [Zr]:[sMAO] = 1:200; 150 mg TiBA co-catalyst; 2 bar ethylene; 10 mg catalyst loading; 50 mL toluene; 40° C.

| Complex | Temperature (° C.) | Time (minutes) | Activity (kg$_{PE}$/(mol$_{Zr}$ · h · bar)) |
|---|---|---|---|
| Pn*ZrCp(NMe$_2$) | 40 | 5 | 5989 ± 63 |
| Pn*ZrCp(NMe$_2$) | 40 | 15 | 3786 ± 159 |
| Pn*ZrCp(NMe$_2$) | 40 | 30 | 2949 ± 105 |
| Pn*ZrCp(NMe$_2$) | 40 | 60 | 2350 ± 15 |

Table 11 suggests that activity decreases with increasing time of the polymerisation.

Example 3m—Effect of Reaction Duration on Catalytic Activity of Solid-MAO Supported Pn*ZrCp(NPh$_2$)

The time dependence of ethylene polymerization activity with solid MAO-supported Pn*ZrCp(NPh$_2$) was assessed. The results are outlined in Table 12 and FIG. 14.

TABLE 12

Time dependence of ethylene polymerization activity with polymethylaluminoxane supported pre-catalyst, Pn*ZrCp(NPh$_2$). Polymerisation conditions [Zr]:[sMAO] = 1:200; 150 mg TiBA co-catalyst; 2 bar ethylene; 10 mg catalyst loading; 50 mL toluene; 40° C.

| Complex | Temperature (° C.) | Time (minutes) | Activity (kg$_{PE}$/(mol$_{Zr}$ · h · bar)) |
|---|---|---|---|
| Pn*ZrCp(NPh$_2$) | 40 | 5 | 4213 ± 95 |
| Pn*ZrCp(NPh$_2$) | 40 | 15 | 2618 ± 11 |
| Pn*ZrCp(NPh$_2$) | 40 | 30 | 2361 ± 147 |
| Pn*ZrCp(NPh$_2$) | 40 | 60 | 1718 ± 37 |

Table 12 suggests that activity decreases with increasing time of the polymerisation.

Example 3n—Morphology Studies

FIG. 15 shows the morphology of polyethylene prepared by the slurry-phase polymerisation of ethylene using solid-MAO supported Pn*ZrCp$^{Me}$Cl, Pn*ZrIndCl and Pn*ZrCp$^{tBu}$Cl (compatator).

FIG. 15 shows that the compositions of the invention can be used to prepare polyethylene having uniform morphology.

While specific embodiments of the invention have been described herein for the purpose of reference and illustration, various modifications will be apparent to a person skilled in the art without departing from the scope of the invention as defined by the appended claims.

The invention claimed is:

1. A composition comprising a solid methyl aluminoxane support material and compound of the formula

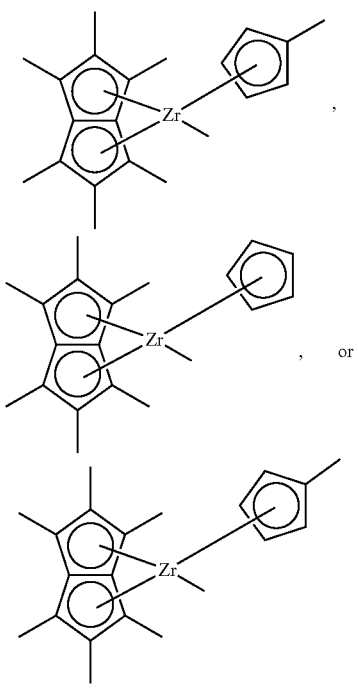

2. The composition of claim 1, wherein the compound is:

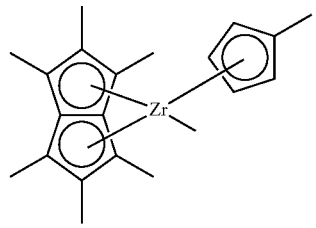

3. The composition of claim 1, further comprising a suitable activator.

4. The composition according to claim 3, wherein the activator is an alkyl aluminium compound.

5. The composition according to claim 3, wherein the activator is methylaluminoxane (MAO), triisobutylaluminium (TIBA), diethylaluminium (DEAC) or triethylaluminium (TEA).

6. A process for polymerising one or more olefins, said process comprising the step of polymerising the one or more olefins in the presence of:
   (i) a composition as claimed in claim 1; and
   (ii) a suitable activator.

7. The process of claim 6, wherein the activator is an alkyl aluminium compound.

8. The process of claim 6, wherein the activator is methylaluminoxane (MAO), triisobutylaluminium (TIBA), diethylaluminium (DEAC) or triethylaluminium (TEA).

9. The process of claim 6, wherein the olefins are a mixture of olefins containing 90-99 wt % of ethene monomers and 1-10 wt % of (4-8C) α-olefin monomers.

10. The process of claim 6, wherein the olefins are ethylene.

* * * * *

UNITED STATES PATENT AND TRADEMARK OFFICE
CERTIFICATE OF CORRECTION

PATENT NO. : 10,888,854 B2
APPLICATION NO. : 15/766170
DATED : January 12, 2021
INVENTOR(S) : Dermot O'Hare et al.

Page 1 of 1

It is certified that error appears in the above-identified patent and that said Letters Patent is hereby corrected as shown below:

In the Claims

Claim 1, Column 42, Line 5, delete the chemical structure " 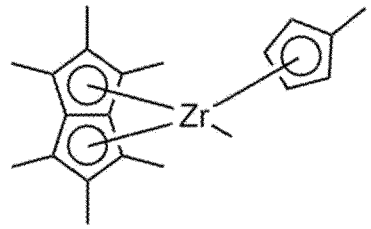 " and substitute therefore the chemical structure 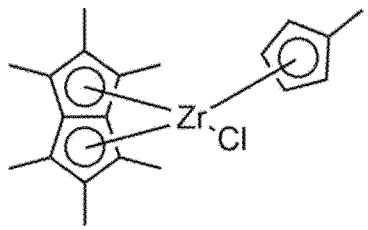 .

Signed and Sealed this
Twenty-eighth Day of March, 2023

Katherine Kelly Vidal
*Director of the United States Patent and Trademark Office*